(12) United States Patent
Tanaka

(10) Patent No.: US 6,650,480 B2
(45) Date of Patent: Nov. 18, 2003

(54) METHOD OF PROCESSING BEAM, LASER IRRADIATION APPARATUS, AND METHOD OF MANUFACTURING SEMICONDUCTOR DEVICE

(75) Inventor: Koichiro Tanaka, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 18 days.

(21) Appl. No.: 09/942,922

(22) Filed: Aug. 31, 2001

(65) Prior Publication Data

US 2002/0027716 A1 Mar. 7, 2002

(30) Foreign Application Priority Data

Sep. 1, 2000 (JP) ......................................... 2000-265451

(51) Int. Cl.[7] .............................................. G02B 27/10
(52) U.S. Cl. ....................................... 359/618; 359/619
(58) Field of Search ................................. 359/618, 619, 359/623, 624, 628, 641, 668; 372/24, 25, 28, 33, 31; 438/149, 30; 219/121.8, 121.75

(56) References Cited

U.S. PATENT DOCUMENTS

| | | |
|---|---|---|
| 5,561,081 A | 10/1996 | Takenouchi et al. ......... 437/174 |
| 5,897,799 A | 4/1999 | Yamazaki et al. ..... 219/121.75 |
| 5,900,980 A | 5/1999 | Yamazaki et al. ........... 359/619 |
| 5,959,779 A | 9/1999 | Yamazaki et al. ........... 359/624 |
| 5,968,383 A | 10/1999 | Yamazaki et al. ..... 219/121.75 |
| 6,002,101 A | 12/1999 | Yamazaki et al. ..... 219/121.75 |
| 6,002,523 A | 12/1999 | Tanaka ....................... 359/624 |
| 6,038,075 A | 3/2000 | Yamazaki et al. ........... 359/626 |
| 6,061,375 A | 5/2000 | Zhang et al. .................. 372/58 |
| 6,104,535 A | 8/2000 | Tanaka ....................... 359/619 |
| 6,137,633 A | 10/2000 | Tanaka ....................... 359/619 |
| 6,157,492 A | 12/2000 | Yamazaki et al. ........... 359/623 |
| 6,159,777 A | 12/2000 | Takenouchi et al. ........ 438/149 |
| 6,160,827 A | 12/2000 | Tanaka ......................... 372/24 |
| 6,176,926 B1 | 1/2001 | Tanaka ......................... 117/92 |
| 6,212,012 B1 | 4/2001 | Tanaka ....................... 359/624 |
| 6,215,595 B1 | 4/2001 | Yamazaki et al. ........... 359/623 |
| 6,239,913 B1 | 5/2001 | Tanaka ....................... 359/619 |
| 6,246,524 B1 | 6/2001 | Tanaka ....................... 359/619 |
| 6,249,385 B1 | 6/2001 | Yamazaki et al. ........... 359/626 |
| 6,291,320 B1 | 9/2001 | Yamazaki et al. ........... 438/487 |
| 6,300,176 B1 | 10/2001 | Zhang et al. ................ 438/166 |
| 6,304,385 B1 | 10/2001 | Tanaka ....................... 359/619 |
| 6,310,727 B1 | 10/2001 | Tanaka ....................... 359/624 |

*Primary Examiner*—Ricky Mack
(74) *Attorney, Agent, or Firm*—Fish & Richardson P.C.

(57) ABSTRACT

Energy of a laser beam with which a non-single crystalline semiconductor film is irradiated to be annealed is uniformly distributed. The laser beam is obtained from a solid-state laser such as a YAG laser which can easily cause interference in an optical system based on the conventional method of simply dividing and combining laser beams, but which can be maintained easily at a low cost in comparison with excimer lasers. A solid-state laser can oscillate to form a laser beam by aligning planes of polarization. Two laser beams having polarization directions independent of each other are formed by using a $\lambda/2$ plate, and a plurality of laser beams are further formed by a stepped quartz block to travel over different optical path lengths. These laser beams are combined into one on or in the vicinity or an irradiation plane by an optical system, thereby forming a uniform laser beam in which interference is effectively limited and the uniformity of energy distribution is high.

69 Claims, 17 Drawing Sheets

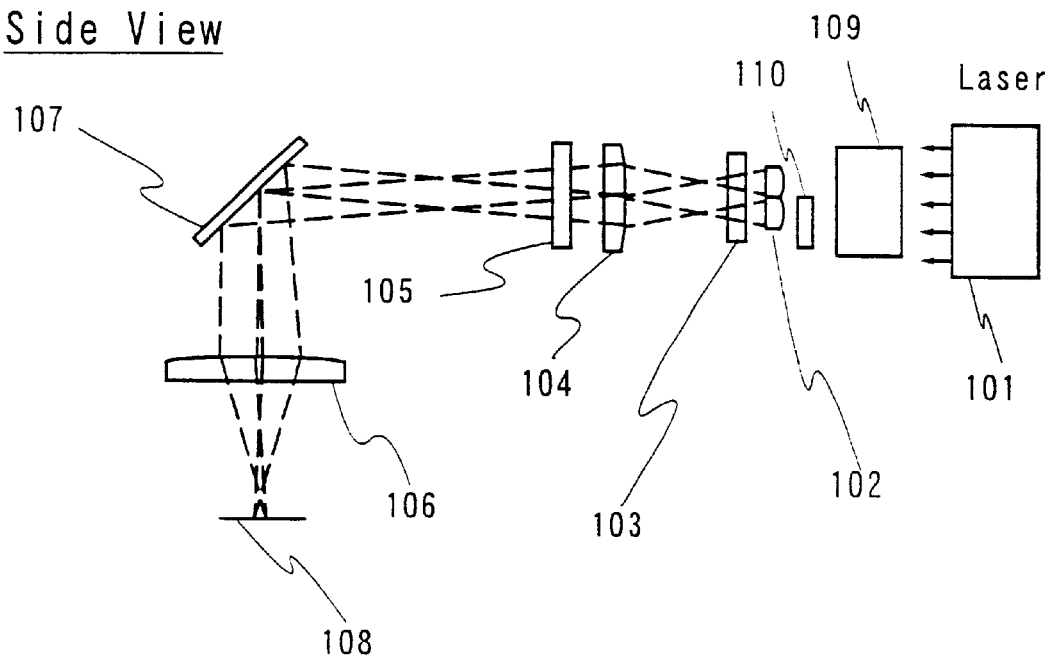
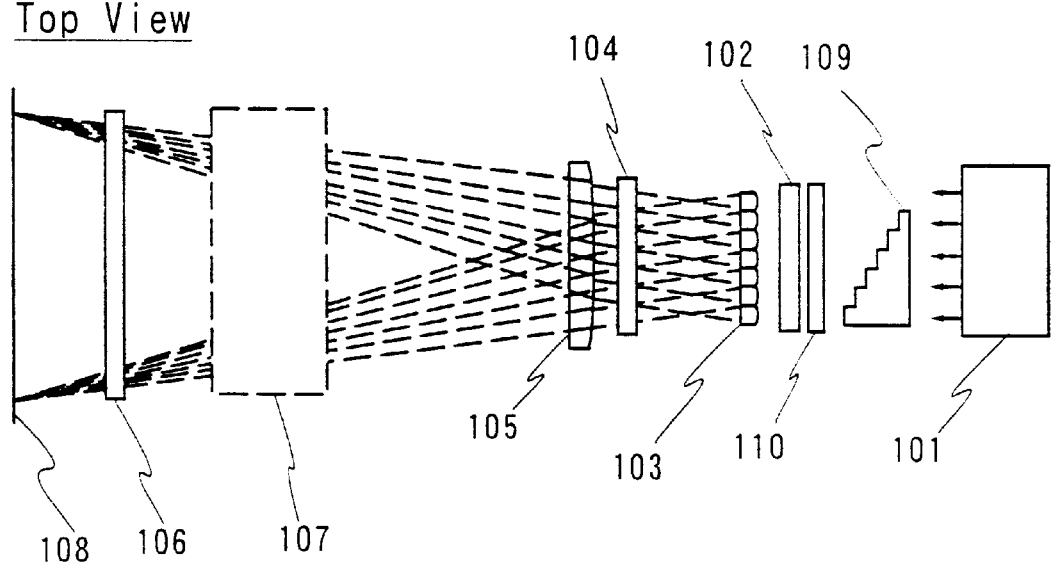
Fig. 1

Side View
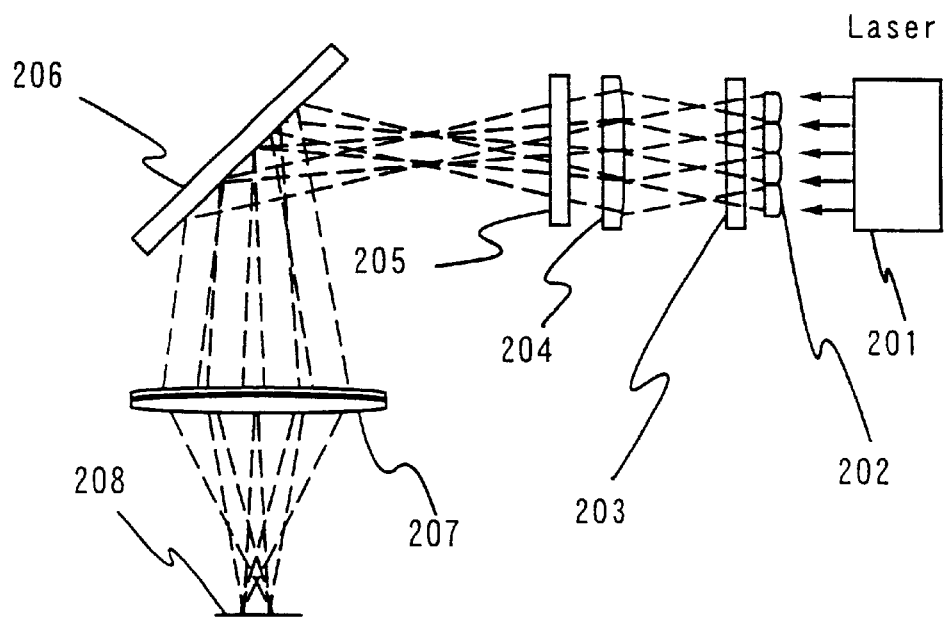
Top View
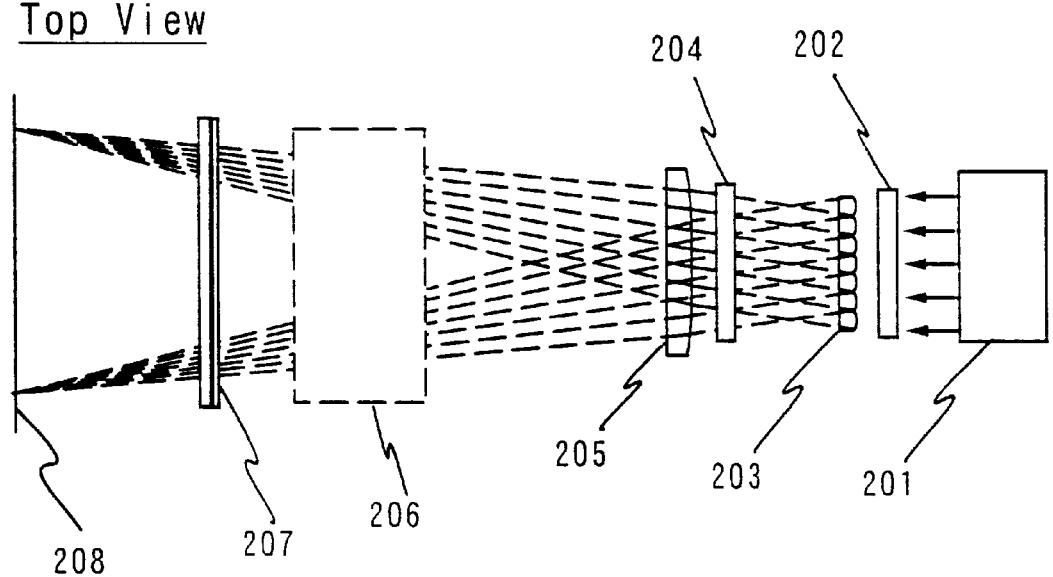
Fig. 2
(Prior Art)

Side View
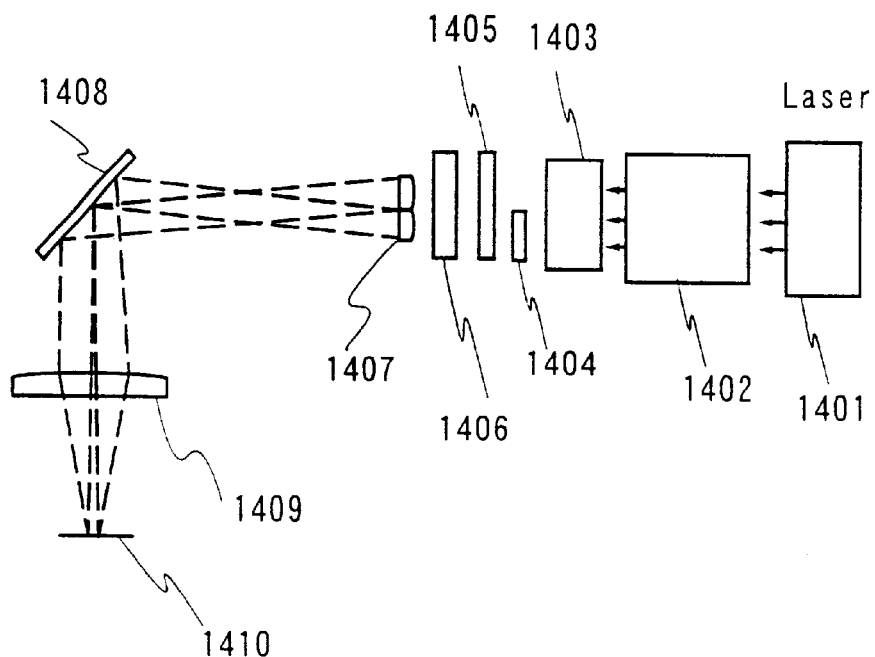
Top View
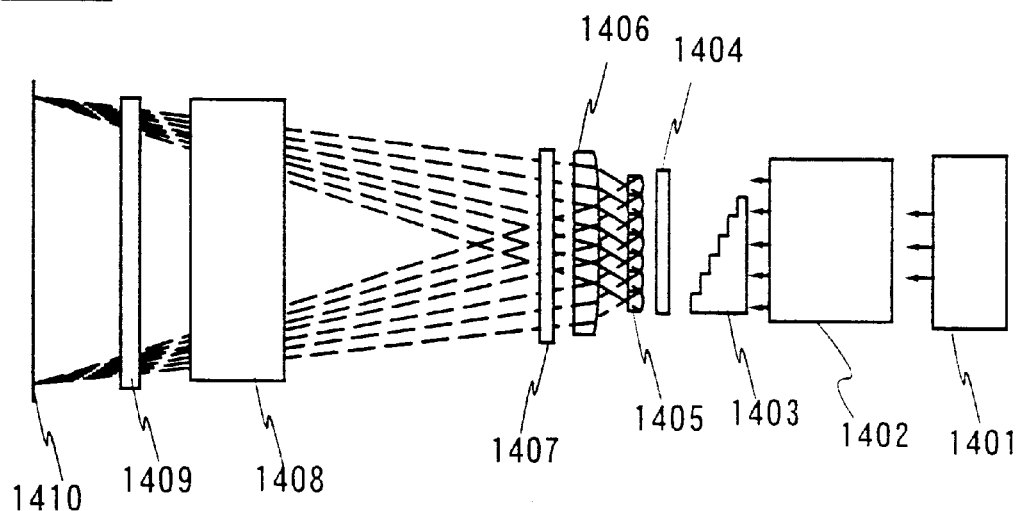
Fig. 4

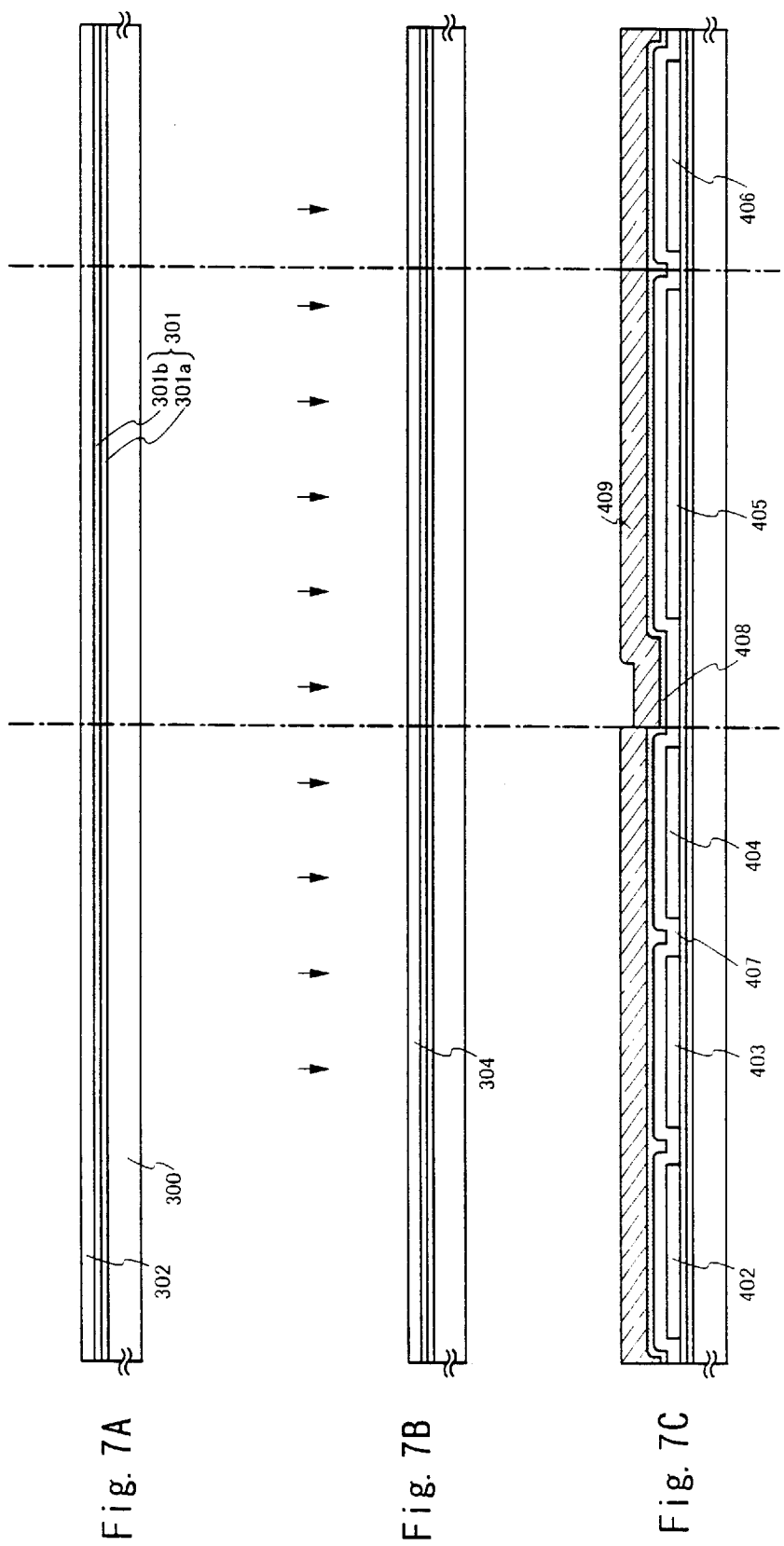

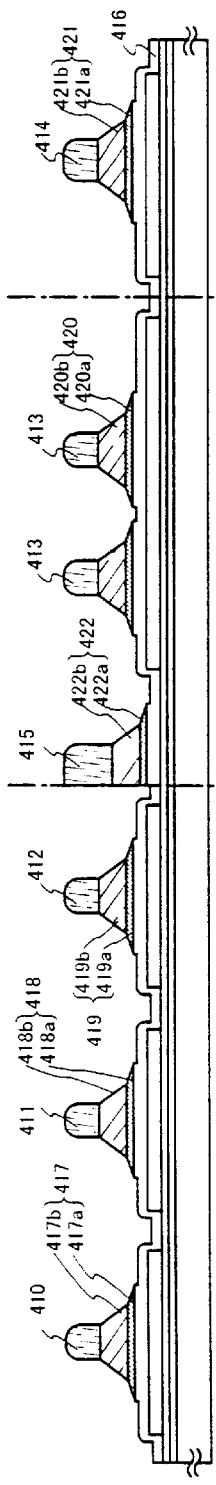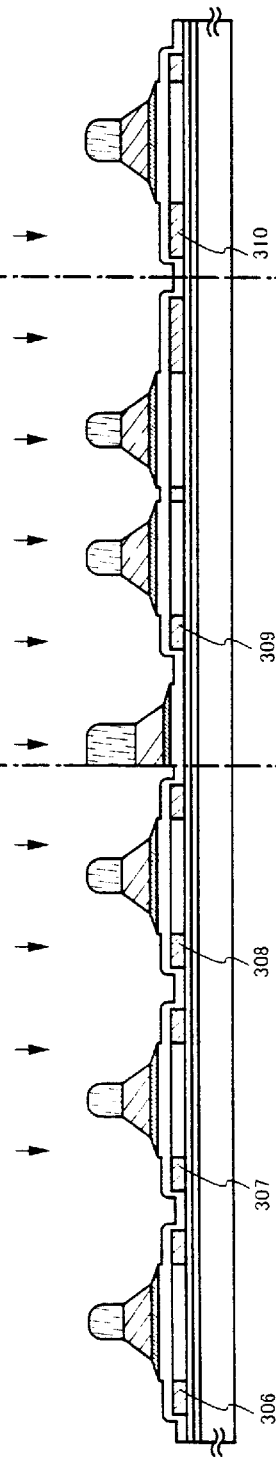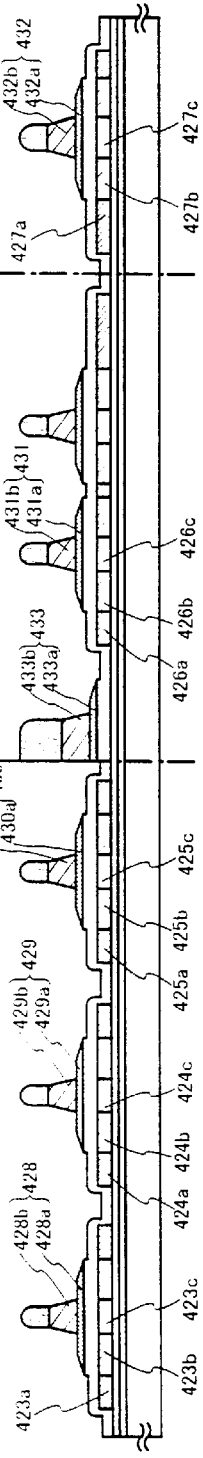

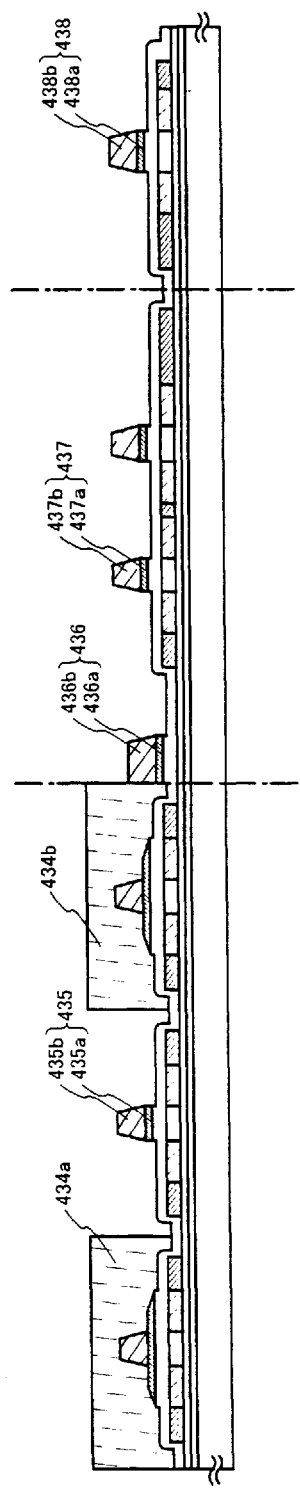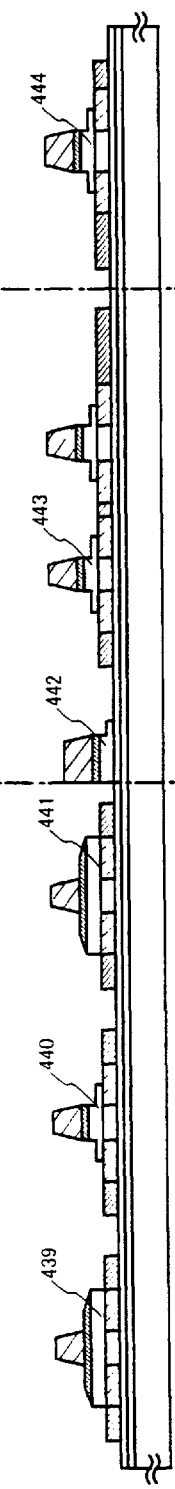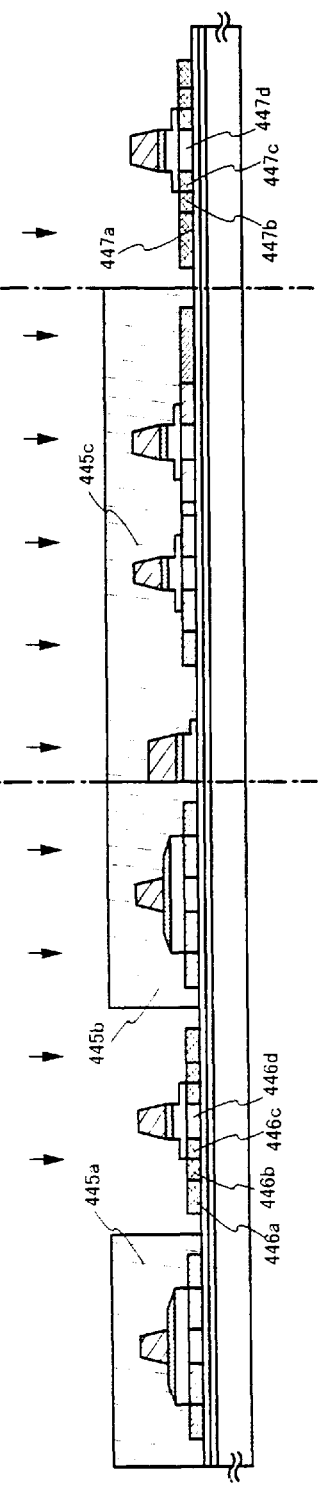

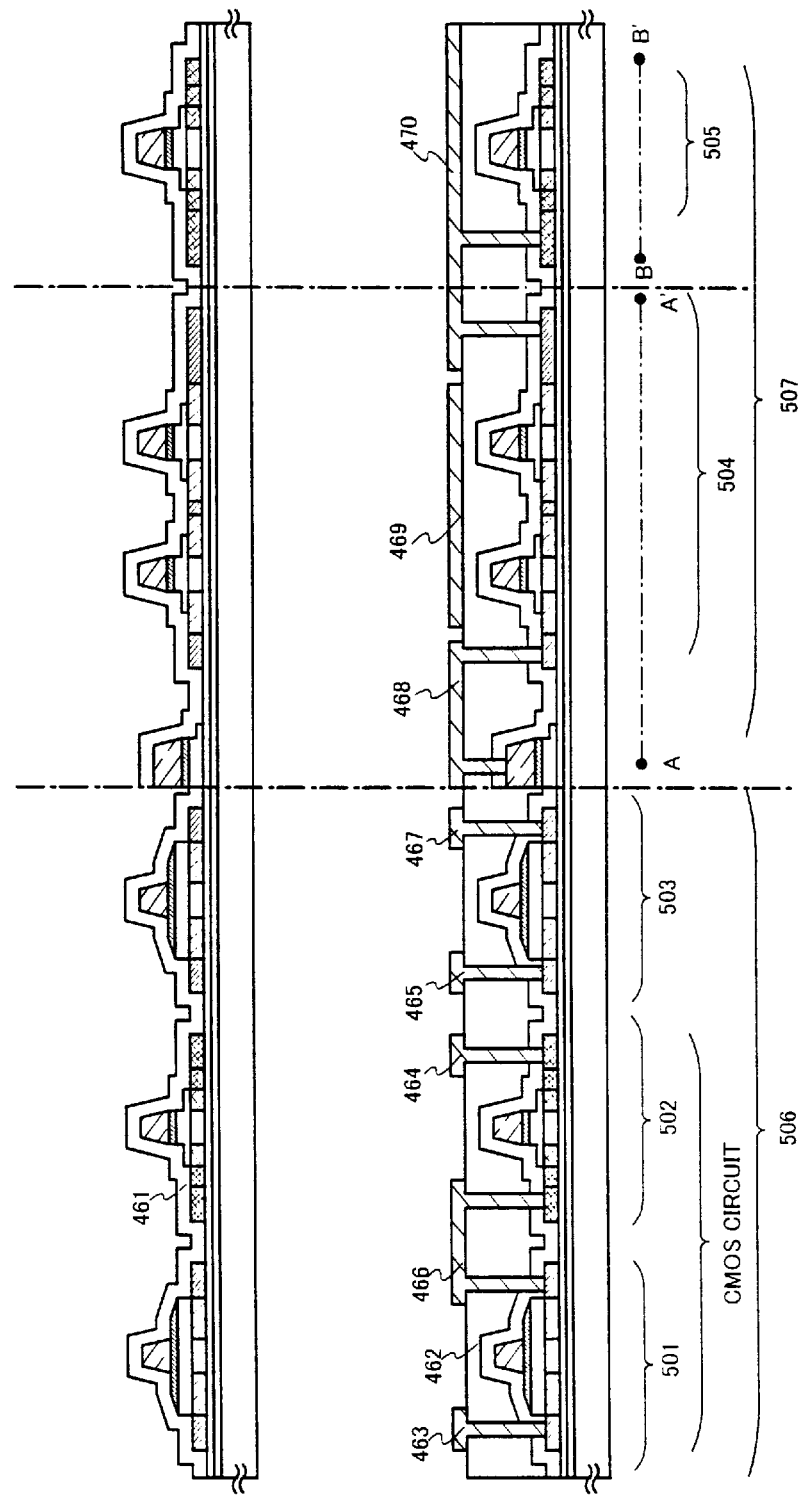

METHOD OF PROCESSING BEAM, LASER IRRADIATION APPARATUS, AND METHOD OF MANUFACTURING SEMICONDUCTOR DEVICE

BACKGROUND OF THE INVENTION

1. Field of the Invention

The present invention relates to a method of making a distribution of energy of a laser beam uniform in a particular region, and to a laser irradiation apparatus (including a laser device and an optical system for guiding a laser beam output from the laser device to a target) for annealing semiconductor film by using a laser beam (hereinafter referred to as laser annealing). And also the present invention relates to a method of manufacturing a semiconductor device manufactured by a method including a process of the laser annealing. In this specification, "semiconductor device" denotes the category of any device capable of functioning by utilizing a semiconductor characteristic, covering electro-optic devices, such as liquid crystal display device and electroluminescent (EL) display devices, and electronic devices including such a kind of electro-optic device as a component.

2. Description of the Related Art

In recent years, studies have been widely made of techniques for performing laser annealing on an amorphous semiconductor film or a crystalline semiconductor film (a semiconductor film having a crystalline property but not single crystalline, i.e., a polycrystalline or microcrystalline semiconductor film), i.e., a non-single crystalline semiconductor film, formed on an insulating substrate such as a class substrate to crystallize the film or improve the crystallographic characteristics of the film. As the above-described kind of semiconductor film, silicon film is ordinarily used.

Glass substrates are low-priced and having high workability in contrast with quartz substrates conventionally used widely. Because of these characteristics, glass is frequently used as the material of a large-area substrate. This is the reason for making the above-mentioned studies. Laser is favorably used for crystallization because the melting point of a glass substrate is low. Laser enables supply of a large amount of energy only to a non-single crystalline film over a substrate without a considerable increase in the temperature of the substrate.

Conventionally, for crystallization of an amorphous semiconductor film by heat, heating at a temperature of 600° C. or higher for ten hours or longer and, preferably, twenty hours or longer is required. An example of a substrate capable of enduring under this crystallization condition is a quartz substrate. A quartz substrate, however, is high-priced and not sufficiently workable. In particular, it is extremely difficult to work quartz into a large-area substrate. Increasing the area of a substrate is an essential factor in increasing the efficiency with which a semiconductor device using the substrate. In recent years, schemes to increase the substrate area for the purpose of improving the production efficiency have been markedly advanced. A substrate size of 600×720 mm is now becoming a standard with respect to factory lines newly constructed.

It is difficult to work quartz into such a large-area substrate as long as a presently available technique is used. A large-area quartz substrate, if any, must be high-priced and is not industrially usable. On the other hand, glass is an example of a material from which a large-area substrate can be easily made. As a glass substrate, a glass called Corning 7059 may be mentioned. Corning 7059 is markedly low-priced and sufficiently workable and can be easily formed into a large-area substrate. Corning 7059, however, has a strain point of 593° C. and cannot be heated at a temperature of 600° C. or higher without a problem.

A Corning 1737 substrate having a comparatively high strain point, 667° C. is known as one of the existing glass substrates. The result of an experiment made by forming an amorphous semiconductor film on Corning 1737 and maintaining the amorphous semiconductor film at a temperature of 600° C. for 20 hours was that there was no such deformation of the substrate as to influence the fabrication process, and the amorphous semiconductor film was crystallized. However, the heating time 20 hours is excessively long if considered as a heating time in a practical production process, and it is desirable to reduce the heating temperature below 600° C. from the viewpoint of production cost.

To solve this problem, a new crystallization method has been devised, details of which are as described in Japanese Patent Application Laid-open Hei No. 7-183540. This method will be described briefly below. First, a small amount of an element, e.g., nickel, palladium, or lead is added to an amorphous semiconductor film. For this addition, a plasma processing or deposition method, an ion implantation method, a sputtering method, a solution application method, or the like may be used. After the addition, the amorphous semiconductor film is placed, for example, in a nitrogen atmosphere at 550° C. for 4 hours to obtain a polycrystalline semiconductor film having good characteristics. The heating temperature and heating time and other hearing conditions most suitable for crystallization depend on the amount of the added element and the state of the amorphous semiconductor film.

An example of crystallization of an amorphous semiconductor film by heating has been described. On the other hand, crystallization of a semiconductor film by laser annealing can be performed even on a plastic substrate or the like as well as on a glass substrate having a low strain point because laser annealing enables supply of a large amount of energy only to the semiconductor film without a considerable increase in a substrate temperature.

Examples of a laser used for laser annealing are an excimer laser and an Ar laser. As a laser annealing method having the advantage of improving the productivity and mass-producibility, a method is favorably used in which a high-power laser beam obtained by pulse oscillation is processed by an optical system so as to form a spot having the shape of a several centimeters square, or a stripe having, for example, a length of 10 cm or longer along an irradiation plane, and the laser irradiation position is moved relative to the irradiation plane in a scanning manner to perform laser annealing. In particular, a use of a laser beam forming a linear on the irradiation plane (hereinafter referred to as "linear beam") is effective in improving the productivity in contrast with a use of a spot laser beam, because scanning with the linear beam only along the direction perpendicular to the lengthwise direction of the stripe formed by the linear beam may suffice for irradiation of the entire target surface while scanning with the spot laser beam must be performed along each of two directions perpendicular to each other. Scanning along the direction perpendicular to the lengthwise direction of the stripe formed by the linear beam has maximum scanning efficiency. Because of this advantage in terms of productivity, a use of a linear beam obtained by processing high-power laser light with a suitable optical system is now becoming mainstream in laser annealing.

FIG. 2 shows an example of an optical system for processing a laser beam so that the beam forms a stripe on a surface to be irradiated. The optical system also has the function of making the distribution of laser beam energy along the irradiation plane uniform as well as processing the laser beam in the form of stripe. In general, an optical system for making the distribution of beam energy uniform is called a beam homogenizer.

The optical system will be described first with reference to the side view in FIG. 2. A laser beam emitted from a laser oscillator 201 is divided by a cylindrical lens array 202 in a direction perpendicular to the direction in which the laser beam travels. This direction perpendicular to the laser beam traveling direction will be referred to as "short-dimension direction" in this specification. In the example shown in FIG. 2, the laser beam is divided into four. The divided laser beams are converged by a cylindrical lens 204 so as be temporarily combined into one. The beams are thereafter reflected by a mirror 206 and then combined into one on an irradiation plane 208 by a doublet cylindrical lens 207. The doublet cylindrical lens is a lens formed by two cylindrical lenses. Thus, the distribution of energy of the linear beam in the short-dimension direction is made uniform and the dimension of the beam in the short-dimension direction is determined.

The optical system will next be described with reference to the top view in FIG. 2. The laser beam emitted from the laser oscillator 201 is divided by a cylindrical lens array 203 in a direction perpendicular to the direction in which the laser beam travels and also perpendicular to the short-dimension direction. This dividing direction will be referred to as "long-dimension direction" in this specification. In the example shown in FIG. 2, the laser beam is divided into seven. The divided laser beams are combined into one on the irradiation plane 208 by a cylindrical lens 205. Thus, the distribution of energy of the linear beam in the long-dimension direction is made uniform and the dimension of the beam in the long-dimension direction is determined.

Each of the above-described lenses is made of synthetic quartz suitable for use with an excimer laser, and an antireflection coating is formed on the surface of each lens to improve transmission of excimer laser light. As a result, the transmittance of each lens with respect to excimer laser light is 99% or higher.

The surface of an amorphous semiconductor film is irradiated with the linear beam processed by the above-described optical system while the beam is gradually shifted in the short-dimension direction so that the irradiated areas overlap, thus performing laser annealing on the entire surface of the amorphous semiconductor film. The amorphous semiconductor film is thereby crystallized or the crystallographic characteristics of the semiconductor film are improved.

The crystalline semiconductor film obtained by the above-described laser annealing is formed of a multiplicity of crystal grains and is therefore called a polycrystalline semiconductor film. Polycrystalline semiconductor films have a markedly high mobility in comparison with amorphous semiconductor films. Therefore, a use of a polycrystalline semiconductor film enables fabrication of a monolithic liquid-crystal electro-optic device (a semiconductor device having thin-film transistors (TFTs) made on one substrate for drive pixel-forming elements and drive circuits), which cannot be realized by using a semiconductor device made by using a conventional amorphous semiconductor film. Thus, polycrystalline semiconductor films have highly advantageous characteristics in comparison with amorphous semiconductor films.

A method of crystallizing an amorphous semiconductor film by performing heating and then performing laser annealing may also be used as well as the above-described method. In some cases, this method is more effective in improving the characteristics of the semiconductor film than that using one of heating and laser annealing for crystallization. To obtain improved characteristics, it is necessary to optimize heating conditions and laser annealing conditions. If a thin-film transistor (TFT) is fabricated by, for example, a well-known method and by using a polycrystalline semiconductor film obtained by the above-described method, the TFT can have remarkably improved electrical characteristics.

Laser annealing is now becoming indispensable for producing a semiconductor film having improved electrical characteristics at a reduced cost. However, the performance of available laser oscillators is not high enough to mass-produce the desired film and there are problems of mass production to be solved, including a problem relating to maintenance of apparatuses used to perform laser annealing. To perform laser annealing of a semiconductor film, at least a laser oscillator, an optical system for making the distribution of energy of a laser beam uniform and for processing the laser beam as desired, and a robot for transporting the semiconductor film are required.

Excimer lasers are often used as a laser oscillator. Excimer lasers emit ultraviolet light which is highly absorbable into a silicon film, which is a typical semiconductor film, and are advantageous in terms of productivity because they are high-powered. However, they are very high-priced, their life is short, and their component parts need to be frequently changed. There is also a need to periodically change the gas necessary for oscillation. Maintenance of an excimer laser is time-consuming, so that the maintenance cost is considerably high. Therefore there is an urgent need for development of a laser annealing device to replace excimer lasers.

Various lasers were developed and improved in the latter half of 1990s. The demand for lasers has grown sharply. Among lasers newly developed. YAG lasers are regarded as suitable lasers for semiconductor film laser annealing. At the earlier stage of the process of putting semiconductor film laser annealing to practical use, there was a movement toward a use of YAG lasers for crystallization of semiconductor films. However, YAG lasers made room for excimer lasers because of their low output stability, their lower output level relative to that of excimer lasers, a need for conversion to a harmonic, etc.

In recent years, however, the output power of YAG lasers has been remarkably increased and the output stability has also been improved. Correspondingly, there has been a tendency to again make trials to apply YAG lasers to laser annealing. In the case of a use of a YAG laser for crystallization of a semiconductor film, there is a need for conversion to a harmonic according to the relationship with the absorption coefficient of the semiconductor film. However, a sufficiently high output level can be maintained even after conversion.

YAG lasers essentially have the advantages of maintainability, compactness and availability at a low price. Since YAG lasers are solid-state lasers and use no gas unlike excimer lasers, they are free from a need to change degraded excitation source components. It is said that the excitation sources (rods) of solid-state lasers has a life of 20 years or longer. Moreover, the number of component parts necessary for laser oscillation in YAG lasers is markedly smaller than that in excimer lasers.

YAG lasers also have a number of problems to be solved, although they have the above-described advantages. First, the oscillation frequency of YAG lasers is lower than that of excimer lasers, from which lower productivity results. This is because when the temperature of the rod of flashlamp-pumped YAG lasers is increased to an excessively high point, the thermal lensing effect becomes high to considerably worsen the laser beam shape and it is difficult to obtain a higher frequency. However, there is the prospect that this problem will be solved because laser diode-pumped YAG lasers capable of limiting the rise of the rod temperature have recently been developed.

Another problem of YAG lasers relates to the coherence of YAG lasers. Lasers in general have high coherence. Therefore, when a linear beam is obtained by the method of obtaining a beam having a uniform energy distribution, which is obtained by dividing a laser beam and by combining the divided beams, interference occurs in the linear beam to cause standing waves. Excimer lasers have a coherence length of several ten microns, which is extremely small in comparison with those of other lasers. In a linear beam obtained from an excimer laser, therefore, interference does not occur easily and standing waves thereby caused are not noticeable.

On the other hand, YAG lasers have a coherence length of about 1 cm, so that the standing waves caused as described above are considerably strong. FIG. 3 shows standing waves in a beam obtained by dividing a YAG laser beam into two beams and by combining the two beams. In FIG. 3 in which an energy distribution is imaged with a CCD camera, a pattern corresponding to a sine curve is clearly recognizable.

SUMMARY OF THE INVENTION

In view of the above-described circumstances, an object of the present invention is to uniformize a distribution of energy of a laser beam having high coherence. The present invention is particularly effective in uniformizing a distribution of energy of a laser beam with a comparatively long coherence length, e.g., a laser beam obtained by a YAG laser, a $YVO_4$ laser or a YLF laser.

The present invention provides a method of manufacturing a semiconductor device by using a method for reducing interference fringes in a linear beam formed by a beam homogenizer.

A laser can produce a beam of linearly polarized light by making its polarization uniform. It is generally known that when laser beams having polarization directions perpendicular to each other are combined, no interference fringes occur. A beam of circularly polarized laser light may also be used. Beams of circularly polarized laser light do not interfere with each other if they differ from each other in the direction of rotation of circularly polarized light. Thus, beams of light having polarization directions independent of each other do not interfere with each other. The effect that the present invention is aimed to achieve can be obtained by utilizing this characteristic.

Therefore, if laser beams having polarization directions perpendicular to each other are combined to form a uniform beam, no interference occurs. A YAG laser or the like can emit linearly polarized laser light. If this layer beam is divided into two, and if a λ/2 plate is inserted in the path for one of the divided two laser beams to rotate the polarization direction through 90° while the other beam is made to travel directly, laser beams having polarization directions perpendicular to each other can be formed. This method enables only division of one beam into two and may be not sufficiently effective in making the resulting beam uniform. Therefore, this method is combined with some other method to increase the number of divisions to achieve sufficiently high uniformity.

To obtain a linear beam having a uniform energy distribution by using a laser having high coherence, it is desirable to obtain improved uniformity in each of the long-dimension direction and the short-dimension direction of the linear beam. Accordingly, it is preferable to combine beams divided into at least two in each direction, i.e., four divided laser beams, into one to form a uniform linear beam. Essentially, in forming a uniform linear beam, it is important to make the distribution of energy uniform in the long-dimension direction. This is because the uniformity in the long-dimension direction is directly reflected in the uniformity of laser annealing in the long-dimension direction. On the other hand, the uniformity in the short-dimension direction is not so important as that in the long-dimension direction. This is because the uniformity of laser annealing can be improved by finely overlapping, in the short-dimension direction, the areas irradiated with the linear beam. Consequently, uniformization in the short-dimension direction of the linear beam is effected by combining two laser beams having polarization directions perpendicular to each other, and uniformization in the long-dimension direction is effected by another method.

Even laser beams emitted from one light source can be combined without interference if they are combined by the optical path length equal to or larger than the coherent length. If this characteristic is utilized, three or more divided laser beams can be combined without interference to obtain a uniform beam. For example, optical path differences may be created by inserting in the optical path a block having high transmittance with respect the laser beam.

The optical path used in accordance with the present invention needs to have optical elements of extremely small aberrations, because high coherence of a laser beam results in a wavelike energy distribution under the influence of a spherical aberration, etc. FIGS. 6A to 6D show the distributions of energy of a laser beam from a YAG laser passed through various cylindrical lenses. "F" in FIGS. 6A to 6D denotes the ratio of the focal length of the lens to the diameter of the aperture of the lens. If F is smaller, the spherical aberration is larger.

FIG. 6A shows the distribution of energy of a laser beam of a YAG laser. This is a photograph of traces of direct irradiation of the laser beam on the amorphous silicon film. In the photograph shown in FIG. 6A, no noticeable energy nonuniformity is recognized. FIG. 6B shows a photograph of the energy distribution in similar irradiation of the amorphous silicon film with the laser beam of the YAG laser when the laser beam was passed through a cylindrical lens of F=7. A fringe pattern extending laterally is clearly recognizable. This is an energy distribution caused under the influence of a spherical aberration of the F=7 cylindrical lens. FIG. 6C shows the result when the beam was passed through a cylindrical lens of F=20, and FIG. 6D shows the result when the beam was passed through a cylindrical lens of F=100. The laser beam passed through the F=7 cylindrical lens was strongly influenced by the spherical aberration to cause a wavelike energy distribution. On the other hand, the laser beam passed through the F=20 cylindrical lens was not largely influenced by the spherical aberration and the resulting wavelike condition of the energy distribution was not noticeable. In the case of the laser beam passed through the F=100 cylindrical lens, no wavelike energy distribution was observed.

The F-number referred to in this specification is calculated by using as the lens aperture the area through which the laser beam passes actually. In a case where the size of the lens is larger than the size of the beam passing therethrough, the size of the beam is used as the aperture.

Structures in accordance with the present invention will be successively described below.

The structures of a beam processing method disclosed by the present invention relates to a method of processing a beam so that a distribution of energy of a laser beam having coherence is made uniform along or in the vicinity of an irradiation plane, the method comprising the steps of:

dividing the laser beam into two laser beams in a first direction perpendicular to the direction of traveling of the laser beam, the two laser beams having polarization directions independent of each other;

combining the two laser beams into one on or in the vicinity of the irradiation plane;

dividing the laser beam into a plurality of laser beams in a second direction perpendicular to the direction of traveling of the laser beam and also perpendicular to the first direction, the plurality of laser beams having optical path lengths different from each other; and combining the plurality of laser beams into one on or in the vicinity of the irradiation plane.

In the above-described structure, the step of dividing the laser beam into two laser beams having polarization directions independent of each other may include using a $\lambda/2$ plate.

Further, another structure of the present invention relates to a method of processing a beam so that a distribution of energy of a laser beam having coherence is made uniform along or in the vicinity of an irradiation plane, the method comprising the steps of:

dividing the laser beam into two laser beams in a first direction perpendicular to the direction of traveling of the laser beam, the two laser beams having polarization directions perpendicular to each other;

combining the two laser beams divided in the first direction into one on or in the vicinity of the irradiation plane;

dividing the laser beam into a plurality of laser beams in a second direction perpendicular to the direction of traveling of the laser beam and also perpendicular to the first direction, the plurality of laser beams having optical path lengths different from each other; and combining the plurality of laser beams into one on or in the vicinity of the irradiation plane.

Further, another structure of the present invention relates to a method of processing a linear beam so that a distribution of energy of a beam of linearly polarized laser light having coherence is made uniform along or in the vicinity of an irradiation plane, the method comprising the steps of:

dividing the laser beam into two laser beams in a first direction perpendicular to the direction of traveling of the laser beam, the two laser beams having polarization directions perpendicular to each other;

combining the two laser beams divided in the first direction into one on or in the vicinity of the irradiation plane to make the distribution of energy of the linear laser beam uniform in a short-dimension direction;

dividing the laser beam into a plurality of laser beams in a second direction perpendicular to the direction of traveling of the laser beam and also perpendicular to the first direction, the plurality of laser beams having optical path lengths different from each other; and combining the plurality of laser beams into one on or in the vicinity of the irradiation plane to make the distribution of energy of the linear laser beam uniform in a long-dimension direction.

In each of the above-described structures, the step of forming the laser beam having the polarization directions perpendicular to each other may include a use of a $\lambda/2$ plate.

Further, another structure of the present invention relates to a method of processing a beam so that a distribution of energy of a beam of circularly polarized laser light having coherence is made uniform along or in the vicinity of an irradiation plane, the method comprising the steps of:

dividing the laser beam into two laser beams in a first direction perpendicular to the direction of traveling of the laser beam, the two laser beam having circularly polarization directions independent of each other;

combining the two laser beams divided in the first direction into one on or in the vicinity of the irradiation plane;

dividing the laser beam into a plurality of laser beams in a second direction perpendicular to the direction of traveling of the laser beam and also perpendicular to the first direction, the plurality of laser beams having optical path lengths different from each other; and combining the plurality of laser beams into one on or in the vicinity of the irradiation plane.

Further, another structure of the present invention relates to a method of processing a linear beam so that a distribution of energy of a beam of circularly polarized laser light having coherence is made uniform along or in the vicinity of an irradiation plane, the method comprising the steps of:

dividing the laser beam into two laser beams in a first direction perpendicular to the direction of traveling of the laser beam, the two laser beam having circularly polarization directions independent of each other;

combining the two laser beams divided in the first direction into one on or in the vicinity of the irradiation plane to make the distribution of energy of the linear laser beam uniform in a short-dimension direction;

dividing the laser beam into a plurality of laser beams in a second direction perpendicular to the direction of traveling of the laser beam and also perpendicular to the first direction, the plurality of laser beams having optical path lengths different from each other; and combining the plurality of laser beams into one on or in the vicinity of the irradiation plane to make the distribution of energy of the linear laser beam uniform in a long-dimension direction.

In each of the above-described structures, the step of forming the two laser beams having the circularly polarization directions independent of each other may include a use of a $\lambda/2$ plate.

Further, in each of the above-described structures, the laser beam comprises one kind or a plurality of kinds of laser beams selected from laser beams emitted from a YAG laser, a $YVO_4$ laser, and a YLF laser. If a plurality of kinds of laser beams are used, interference in the laser beam along or in the vicinity of the irradiation plane can be further reduced.

Further, in each of the above-described structures, the step of setting different optical path lengths in correspondence with the plurality of laser beams may include using a block having a high transmittance with respect to the laser beam.

Further, in each of the above-described structures, the step of dividing the laser beam into a plurality of laser beams includes a use of a cylindrical lens having an F-number of 20 or larger.

Further, in each of the above-described structures, the step of combining the plurality of laser beams includes a use of a cylindrical lens having an F-number of 20 or larger.

Further, a structure of a laser irradiation apparatus disclosed by the present invention relates to a laser irradiation apparatus for forming a laser beam having a uniform energy distribution along or in the vicinity of an irradiation plane, the apparatus comprising:

a laser oscillator for forming a laser beam having coherence;

means for dividing the laser beam into two laser beams in a first direction perpendicular to the direction of traveling of the laser beam, the divided two laser beams having polarization directions independent of each other;

means for combining the two laser beams into one on or in the vicinity of the irradiation plane;

means for dividing the laser beam into a plurality of laser beams in a second direction perpendicular to the direction of traveling of the laser beam and also perpendicular to the first direction, the plurality of laser beams having optical path lengths different from each other; and means for combining the plurality of laser beams into one on or in the vicinity of the irradiation plane.

In the above-described structure, the means for dividing the laser beam into two laser beams having polarization directions independent of each other may include a $\lambda/2$ plate.

Further, another structure of the present invention relates to a laser irradiation apparatus for forming a laser beam having a uniform energy distribution along or in the vicinity of an irradiation plane, the apparatus comprising:

a laser oscillator for forming a laser beam of linearly polarized laser light having coherence;

means for dividing the laser beam into two laser beams in a first direction perpendicular to the direction of traveling of the laser beam, the two laser beams having polarization directions perpendicular to each other;

means for combining the two laser beams divided in the first direction into one on or in the vicinity of the irradiation plane;

means for dividing the laser beam into a plurality of laser beams in a second direction perpendicular to the direction of traveling of the laser beam and also perpendicular to the first direction;

dividing the laser beam into a plurality of laser beams in a second direction perpendicular to the direction of traveling of the laser beam and also perpendicular to the first direction, the plurality of laser beams having optical path lengths different from each other; and means for combining the plurality of laser beams into one on or in the vicinity of the irradiation plane.

Further, another structure of the present invention relates to a laser irradiation apparatus for forming a linear laser beam distributed along or in the vicinity of an irradiation plane, the apparatus comprising:

a laser oscillator for forming a laser beam of linearly polarized laser light having coherence;

means for dividing the laser beam into two laser beams in a first direction perpendicular to the direction of traveling of the laser beam, the two laser beams having polarization directions perpendicular to each other;

means for combining the two laser beams divided in the first direction into one on or in the vicinity of the irradiation plane to make the distribution of energy of the linear laser beam uniform in a short-dimension direction;

means for dividing the laser beam into a plurality of laser beams in a second direction perpendicular to the direction of traveling of the laser beam and also perpendicular to the first direction, the plurality of laser beams having optical path lengths different from each other; and means for combining the plurality of laser beams into one on or in the vicinity of the irradiation plane to make the distribution of energy of the linear laser beam uniform in a long-dimension direction.

In the each of the above-described structures, the means for forming the two laser beams having polarization directions independent of each other may include a $\lambda/2$ plate.

Further, another structure of the present invention relates to a laser irradiation apparatus for forming a laser beam having a uniform energy distribution along or in the vicinity of an irradiation plane, said apparatus comprising:

a laser oscillator for forming a laser beam of circularly polarized laser light having coherence;

means for dividing the laser beam into two laser beams in a first direction perpendicular to the direction of traveling of the laser beam, the two laser beam having circularly polarization directions independent of each other;

means for combining the two laser beams divided in the first direction into one on or in the vicinity of the irradiation plane;

means for dividing the laser beam into a plurality of laser beams in a second direction perpendicular to the direction of traveling of the laser beam and also perpendicular to the first direction, the plurality of laser beams having optical path lengths different from each other; and means for combining the plurality of laser beams into one on or in the vicinity of the irradiation plane.

Further, another structure of the present invention relates to a laser irradiation apparatus for forming a linear laser beam distributed along or in the vicinity of an irradiation plane, the apparatus comprising:

a laser oscillator for forming a laser beam of circularly polarized laser light having coherence;

means for dividing the laser beam into two laser beams in a first direction perpendicular to the direction of traveling of the laser beam, the two laser beam having circularly polarization directions independent of each other;

means for combining the two laser beams divided in the first direction into one on or in the vicinity of the irradiation plane to make the distribution of energy of the linear laser beam uniform in a short-dimension direction;

means for dividing the laser beam into a plurality of laser beams in a second direction perpendicular to the direction of traveling of the laser beam and also perpendicular to the first direction, the plurality of laser beams having optical path lengths different from each other; and means for combining the plurality of laser beams into one on or in the vicinity of the irradiation plane to make the distribution of energy of the linear laser beam uniform in a long-dimension direction.

In each of the above-described structures, the laser oscillator is one kind or a plurality of kinds selected from the group consisting of a YAG laser, a $YVO_4$ laser, and a YLF laser.

Further, in each of the above-described structures, the means for dividing the laser beam into a plurality of laser beams comprises a cylindrical lens having an F-number of 20 or larger.

Further, in each of the above-described structures, the means for combining the plurality of laser beams includes a use of a cylindrical lens having an F-number of 20 or larger.

Further, a structure of a manufacturing method of a semiconductor device disclosed by the present invention relates to a method of manufacturing a semiconductor device having a TFT formed on a substrate, the method comprising the steps of:

forming a non-single crystalline semiconductor film over the substrate;

irradiating a non-single crystalline silicon film with a linear beam while moving the beam relative to the semiconductor film; and forming the linear beam, the step of forming the linear beam including;

oscillating a laser beam having coherence;

dividing the laser beam into two laser beams in a first direction perpendicular to the direction of traveling of the laser beam, the divided two laser beams having polarization directions independent of each other;

combining the two laser beams into one on or in the vicinity of the irradiation plane;

dividing the laser beam into a plurality of laser beams in a second direction perpendicular to the direction of traveling of the laser beam and also perpendicular to the first direction; and combining the plurality of laser beams into one on or in the vicinity of the irradiation plane to form the linear laser beam having a long-dimension direction parallel to the second direction.

In each of the above-described structures, the laser oscillator is one kind or a plurality of kinds selected from the group consisting of a YAG laser, a $YVO_4$ laser, and a YLF laser.

Further, in the above-described structure, a method of forming the linear laser beam comprises a cylindrical lens having an F-number of 20 or larger.

As described above, the present invention makes it possible to effectively improve the uniformity of the distribution of energy of a laser beam having coherence by reducing the coherence of the laser beam. If a combination of the present invention and a solid-state laser is used in the process of crystallizing a semiconductor film, a remarkable reduction in manufacturing cost can be expected. Also, suitable operating characteristics and sufficiently high reliability can be achieved in electro-optic devices and semiconductor devices fabricated by making TFTs on the thus-obtained semiconductor film and by using the TFTs, which devices are typified by an active-matrix liquid crystal display device.

BRIEF DESCRIPTION OF THE DRAWINGS

In the accompanying drawings:

FIG. 1 is a diagram showing an example of a laser irradiation apparatus disclosed in the present invention;

FIG. 2 is a diagram showing an example of a conventional laser irradiation apparatus;

FIG. 4 is a diagram showing an example of a laser irradiation apparatus disclosed in the present invention;

FIGS. 7A to 7C are cross-sectional views showing the process of manufacturing pixel TFTs, and drive circuit TFTs;

FIGS. 8A to 8C are cross-sectional views showing the process of manufacturing pixel TFTs, and drive circuit TFTs;

FIGS. 9A to 9C are cross-sectional views showing the process of manufacturing pixel TFTs, and drive circuit TFTs;

FIGS. 10A and 10B are top and cross-sectional views showing the process of manufacturing pixel TFTs, and drive circuit TFTs;

DETAILED DESCRIPTION OF THE PREFERRED EMBODIMENTS

Figure 3:
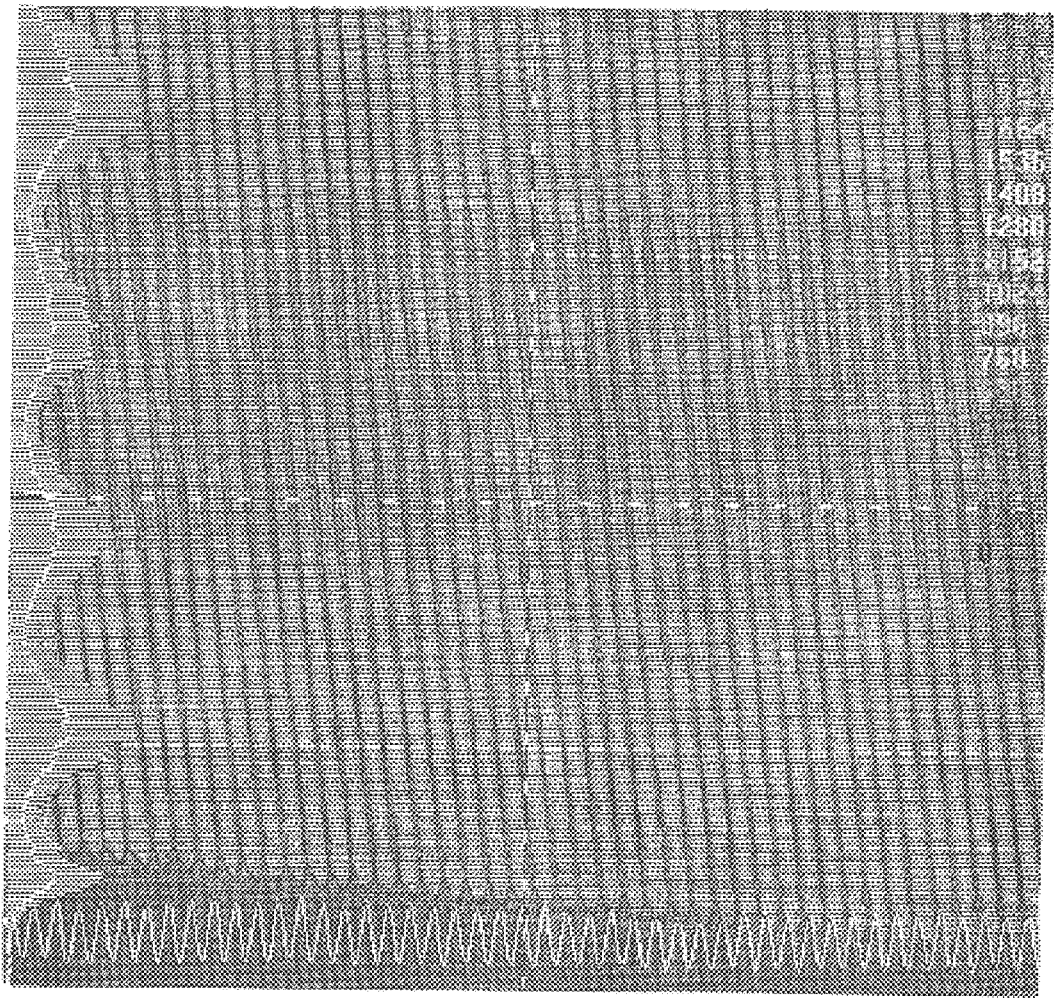
FIG. 3 is a diagram showing the state of interference between two beams formed from a beam having high coherence.

FIG. 1 shows an optical system capable of reducing coherence and obtaining a linear beam having a uniform energy distribution.

The optical system will be described first with reference to the top view in FIG. 1. A laser beam emitted from a laser oscillator 101 enters a quartz block 109 worked into a stepped shape such that optical path differences are successively created in a stepping manner along a direction perpendicular to the direction in which the laser beam travels. The stepped quartz block 109 is intended to create an optical path difference between laser beam portions passing through each adjacent pair of the steps. It is important that the optical path difference thereby created be larger than the coherence length of the laser beam used. This is because when laser beams with an optical path difference larger than the coherence length hit the same region, coherence is extremely low.

The quartz block 109 used in the structure shown in FIG. 1 has six steps. Seven laser beams having seven different optical path lengths are thereby obtained. That is, six laser beams pass through the quartz block 109 while another laser beam travels without passing through the quartz block 109. The seven laser beams respectively enter seven cylindrical lenses constituting a cylindrical lens array 103. The seven laser beams having the above-described optical path difference from each other are separated by the cylindrical lens array 103. The seven separated laser beams are combined into one on an irradiation plane 108 by a cylindrical lens 105. If a sufficiently large optical path difference has been created between each adjacent pair of the separated laser beams by the function of the quartz block 109, no strong interference occurs in the laser beam along the irradiation plane 108. Thus, the distribution of energy of the linear beam in the long-dimension direction is made uniform and the dimension of the beam in the long-dimension direction is determined.

The optical system will next be described with reference to the side view in FIG. 1. It is assumed here that the laser beam emitted from the laser oscillator 101 is a beam of linearly polarized light. The laser beam enters a λ/2 plate 110 to form two laser beams having planes of polarization perpendicular to each other. The two laser beams respectively enter two cylindrical lenses constituting a cylindrical lens array 102. The laser beams separated by the cylindrical lens array 102 are combined into one on the irradiation plane 108 by cylindrical lenses 104 and 106. A mirror 107 in the optical path is provided to enable the irradiation plane to be set in correspondence with a horizontal plane. If the laser beam optical path is formed along a vertical direction from the light source side, there is no need to use the mirror 107. Also, if the irradiation plane is to be vertically set, there is no need for the mirror 107. In such a case, a means for fixing the irradiation target on a wall perpendicular to the ground is required. Thus, the distribution of energy of the linear beam in the short-dimension direction is made uniform and the dimension of the beam in the short-dimension direction is determined.

While in the above-described structure the laser beam emitted from the laser oscillator is linearly polarized light, a beam of circularly polarized laser light may alternatively be used. If beams of circularly polarized laser light have different directions of rotation of circularly polarized light, they do not interfere with each other. If this characteristic is utilized, the effect that the present invention is aimed to achieve can be obtained. Thus, two laser beams can exist which have coherence but have such different polarized states as not to interfere with each other. In this specification, such beams will be referred to as beams independent of each other in polarization direction.

As laser oscillator 101, a laser such as a YAG laser, a $YVO_4$ laser or a YLF laser capable of aligning planes of polarization is used. From the viewpoint of the throughput in the case of use in a manufacturing plant, it is preferable to use a high-repetition pulse laser. In selecting a high-repetition solid-state laser, it is important to consider limitation of the rod temperature. An example of a laser capable of limiting the rise of the rod temperature is a laser diode-pumped solid-state laser. From the viewpoint of mass production, a combination of the method of uniformizing the laser beam energy distribution in accordance with the present invention and a laser diode-pumped solid-state laser is considered to be particularly useful. Also, if a plurality of kinds of laser selected from YAG, $YVO_4$, YLF lasers are used, interference of laser beams along and in the vicinity of the irradiation plane can be further reduced.

The present invention comprising the above-described structure will be described in more detail with respect to embodiments thereof.

[Embodiment 1]

A first embodiment of the present invention will be described with respect to a semiconductor device fabrication process in which an amorphous silicon film is formed on a glass substrate and is crystallized by a laser irradiation method in accordance with the present invention.

An example of a method of forming an amorphous silicon film will first be described. A 5-inch-square Corning 1737 substrate is first cleansed to remove foreign particles from the substrate surface. Next, on the substrate are formed a 100 nm thick silicon oxynitride film and then a 55 nm thick amorphous silicon film by a plasma CVD apparatus. The silicon oxynitride film referred to in this specification is a film of an insulating material expressed by $SiO_xN_y$, i.e., an insulating film containing silicon, oxygen and nitrogen in predetermined proportions. The amorphous silicon film may contain a substantial amount of hydrogen. In such a case, the hydrogen content is reduced by, for example, a heat treatment to improve the laser resistance of the amorphous silicon film. In such a case, the amorphous silicon film may be heated in a nitrogen atmosphere at 500° C. for one hour, for example.

An optical system used in this embodiment will next be described with reference to FIG. 4. The optical system will be described first with reference to the top view in FIG. 4. A laser oscillator 1401 is a flashlamp-pumped YAG laser. In this embodiment, to anneal the amorphous silicon film, a laser beam emitted from the YAG laser is converted to the second harmonic sufficiently absorbable into the amorphous silicon film by using a nonlinear optical element. The output from the laser after conversion to the second harmonic is 800 mJ per pulse. The maximum frequency is 30 Hz. The laser beam emitted from the laser oscillator 1401 has a φ10 mm size. This beam is too thin to be processed. Therefore it is expanded in the long-dimension direction by a beam expander 1402. In this embodiment, the laser beam is expanded in one direction at an expansion rate of 3.5. As beam expander 1402, one designed so as to minimize aberrations is used.

The laser beam which has been processed by the beam expander so as to have an elliptical shape having a larger diameter of 35 mm and a smaller diameter of 10 mm passes a quartz block 1403 worked in a stepping manner to form seven laser beams having an optical path difference from each other. The quartz block 1403 has six (7-1) steps. Each step has a thickness of 15 mm, and the thickest portion of the quartz block 1403 has a thickness of 90 mm. The minimum optical path difference between the seven laser beams created by this quartz block is 7 mm. This value is approximately equal to the coherence length of this YAG laser.

The seven beams from the quartz block 1403 respectively enter cylindrical lenses constituting a cylindrical lens array 1405. The laser beams separated by the cylindrical lens array 1405 are combined into one on an irradiation plane 1410 (see the side view) by a cylindrical lens 1406. Thus, the distribution of energy of the linear beam in the long-dimension direction is made uniform. Also, the dimension of the beam in the long-dimension direction is determined. Since the seven laser beams have the optical path difference larger than the coherence length from each other, interference between them along the irradiation plane 1410 is very weak. A mirror 1408 is used to change the direction of traveling of the laser beams so that the laser beams travel along a direction perpendicular to the plane of projection of the top view in FIG. 4. The linear beam is formed on a horizontal plane by the mirror 1408 and the irradiation target can be placed along the horizontal plane.

The optical system will next be described with reference to the side view in FIG. 4. It is assumed that the laser oscillator 1401 is designed to emit linearly polarized light, and that the polarization direction is parallel to the plane of projection of the side view and perpendicular to the direction in which the laser beam travels. After the laser beam has been processed by the beam expander 1402 so as to have the elliptical shape, it enters a λ/2 plate 1404. The λ/2 plate 1404 is rectangular and is placed so that its one side coincides with the major axis of the elliptical shape of the laser beam. Therefore only half of the laser beam enters the λ/2 plate. The polarization direction of the laser beam is rotated through 90° by the λ/2 plate 1404. The laser beam is thereby divided into a beam of laterally polarized light and a beam of vertically polarized light. The beam of laterally polarized laser light and the beam of vertically polarized laser light respectively enter cylindrical lenses constituting a cylindrical lens array 1407. The laser beams thereby separated into two are combined into one on the irradiation plane 1410 by a cylindrical lens 1409. Thus, the distribution of energy of the linear beam in the short-dimension direction is made uniform. Also, the dimension of the beam in the short-dimension direction is determined. The mirror 1408 is used to enable horizontal setting of the irradiation plane 1410.

The specifications of each lens will next be described. The cylindrical lens array 1405 is formed by combining seven cylindrical lenses each having a width of 5 mm, a length of 30 mm, a thickness of 4 mm, and a focal length of 400 mm. The cylindrical lens 1406 has a width of 60 mm, a length of 30 mm, a thickness of 4 mm, and a focal length of 4800 mm. The cylindrical lens 1406 is placed at a distance of 400 mm in the rear direction from the cylindrical lens array 1405. The cylindrical lens array 1407 is formed by combining two cylindrical lenses each having a width of 5 mm, a length of 60 mm, a thickness of 5 mm, and a focal length of 2000 mm. The cylindrical lens array 1407 is placed at a distance of 400 mm in the rear direction from the cylindrical lens 1406. The mirror 1408 is placed at a distance of 3600 mm in the rear direction from the cylindrical lens array 1407. The mirror 1408 is used to change the laser beam traveling direction trough 90°. The size of the mirror 1408 has a size large enough to reflect the entire of each separated laser beam. In this embodiment, a mirror surface size of 120×120 mm may suffice.

The cylindrical lens 1409 is placed following the mirror 1408. The cylindrical lens 1409 has a width of 50 mm, a length of 130 mm, a thickness of 15 mm, and a focal length of 400 mm. The irradiation plane 1410 is placed at a distance of 400 mm in the rear direction from the cylindrical lens 1409.

In the above-described optical system, the linear beam has a long-dimension dimension of 120 mm and a short-dimension dimension of 1 mm along the irradiation plane 1410. The above-described specifications and layout of the optical system are only typical examples. When an executer actually forms the linear beam, it is necessary to arrange the optical system by considering certain errors. A stage on which the amorphous semiconductor film provided as an irradiation target can be placed is provided along the irradiation plane 1410. The entire surface of the amorphous semiconductor film can be irradiated with the laser beam by moving the stage in one direction perpendicular to the long-dimension direction of the linear beam.

Irradiation conditions under which the amorphous semiconductor film provided as an irradiation target is irradiated with the laser beam to be crystallized are as described below.

The energy density of the laser beam is 450 mJ/cm$^2$ at the irradiation plane 1410. The stage moving speed is a constant speed of 3 mm/sec. The target is irradiated with the laser beam in atmospheric air. The laser beam oscillation frequency is 30 Hz. Accordingly, one area of the amorphous semiconductor film is irradiated ten times with the laser beam. The amorphous semiconductor film is crystallized by the above-described sequence of operations.

A semiconductor device is fabricated on the polycrystalline silicon film made by the above-described steps. The semiconductor device comprises, a thin-film transistor (TFT), a diode, a photosensor, etc., each of which can be fabricated on the polycrystalline silicon film. A chemical compound semiconductor film other than the polycrystalline silicon film, e.g., a polycrystalline germanium silicate film may also be used.

[Embodiment 2]

A second embodiment of the present invention will be described with respect to a process in which a polycrystalline semiconductor film is irradiated with a linear beam to be annealed.

A method of forming a polycrystalline semiconductor will first be described. A 5-inch-square Corning 1737 substrate is first cleansed to remove foreign particles from the substrate surface. Next, on the substrate are formed a 100 nm thick silicon oxynitride film and then a 55 nm thick amorphous silicon film by a plasma CVD apparatus. The silicon oxynitride film referred to in this specification is a film of an insulating material expressed by SiOxNy, i.e., an insulating film containing silicon, oxygen and nitrogen in predetermined proportions. Next, the amorphous silicon film is processed by a method such as that described in Japanese Patent Application Laid-open No. Hei 7-183540. That is, a nickel acetate aqueous solution (density in terms of weight: 5 ppm, volume: 5 ml) is applied to the surface of the amorphous silicon film by spin coating, followed by heating in a nitrogen atmosphere at 500° C. for one hour and by further heating in a nitrogen atmosphere at 550° C. for four hours. The amorphous silicon film is thereby changed into a polycrystalline silicon film.

Laser annealing is performed on the obtained polycrystalline silicon film. The same laser annealing method as that described above with respect to the first embodiment is used. There are some differences between the irradiation conditions in the case of irradiating the amorphous silicon film with the linear beam and the irradiation conditions in the case of irradiating the polycrystalline silicon film with the linear beam. However, the differences are not large. It is necessary for the executer to experimentally find optimum irradiation conditions.

A semiconductor device is fabricated on the polycrystalline silicon film made by the above-described steps. The semiconductor device comprises, a thin-film transistor (TFT), a diode, a photosensor, etc., each of which can be fabricated on the polycrystalline silicon film. A chemical compound semiconductor film other than the polycrystalline silicon film, e.g., a polycrystalline germanium silicate film may also be used.

[Embodiment 3]

Figure 5:
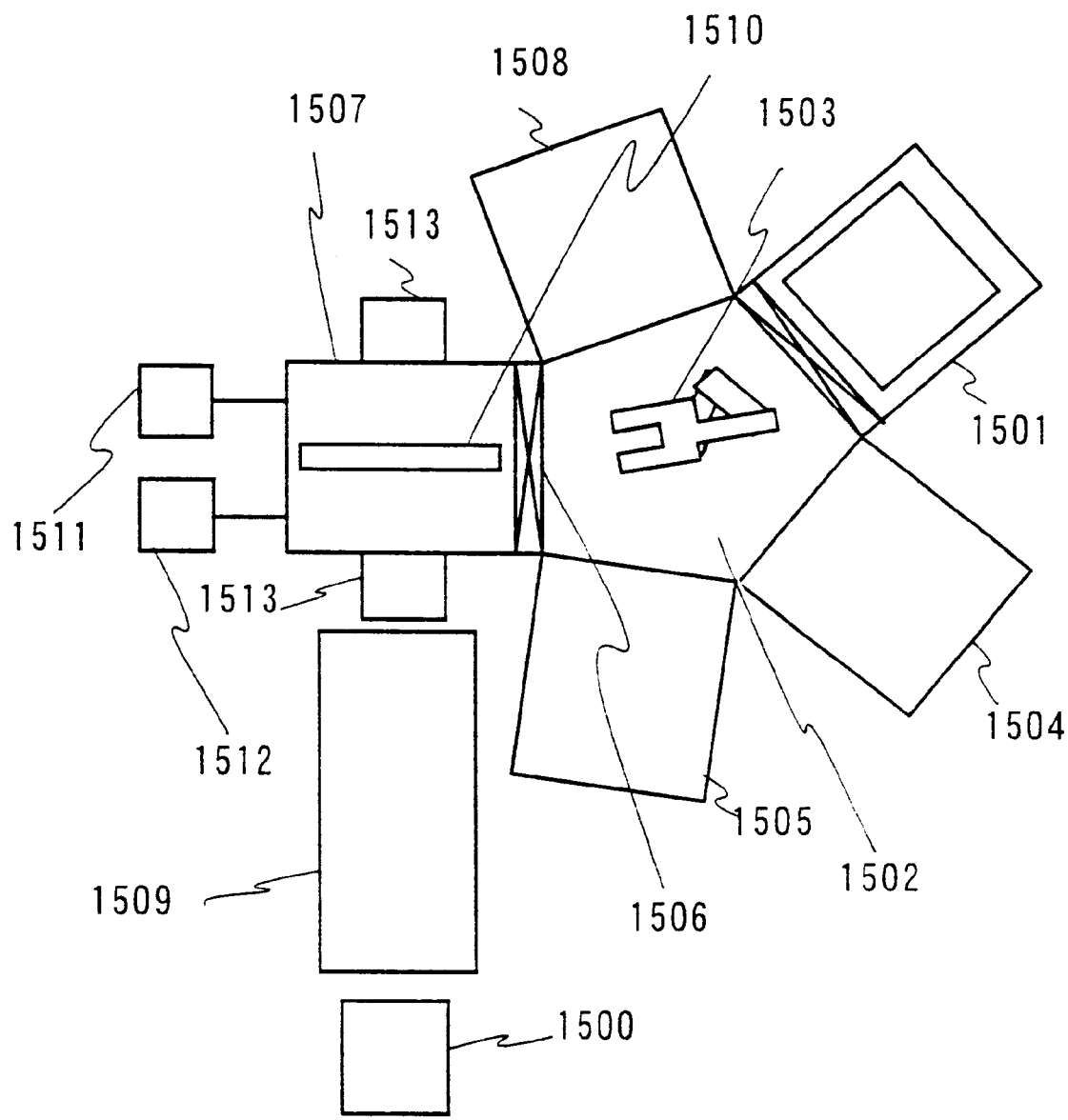
FIG. 5 is a diagram showing an example of a laser irradiation apparatus for mass production.
Figure 6A:
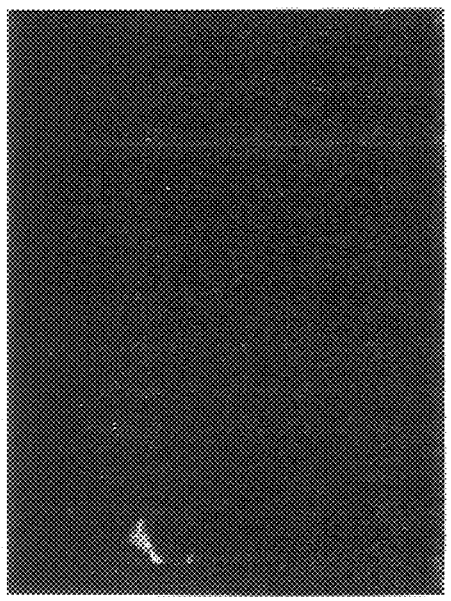
FIGS. 6A to 6D are diagrams showing fringe-like energy distributions due to spherical aberrations of cylindrical lenses.
Figure 6B:
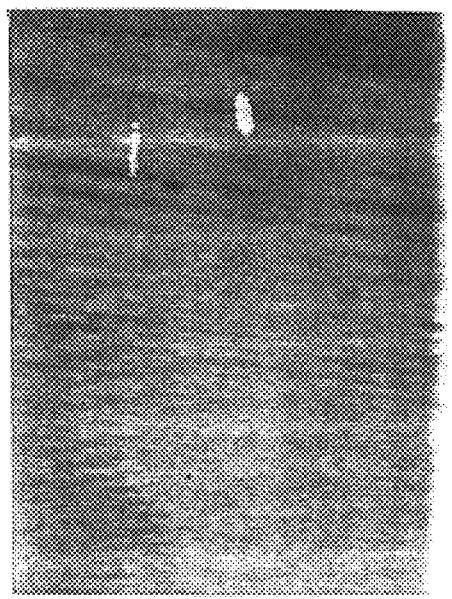
Figure 6C:
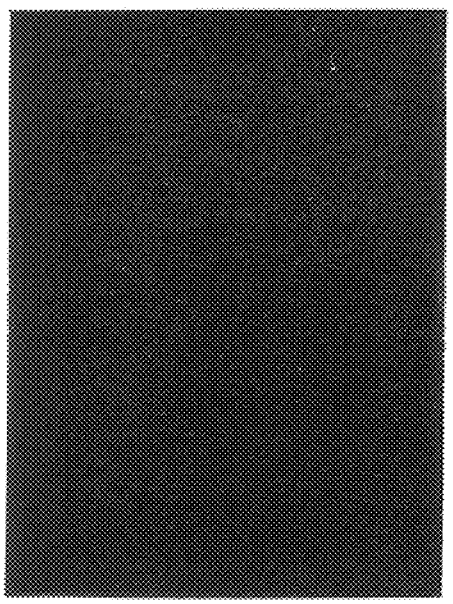
Figure 6D:
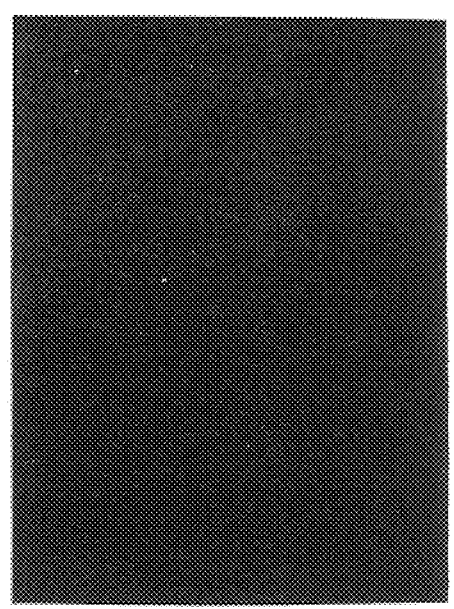

Referring to FIG. 5, an example of a laser irradiation apparatus for mass production is shown here in Embodiment 3. FIG. 5 shows a top view of a laser irradiation apparatus.

Using a robot arm 1503 for conveyance installed in a transfer chamber 1502, a substrate is transported from a load/unload chamber 1501. First, the substrate is transported to a preheat chamber 1505 after positioning is made in an alignment chamber 1504. Then using, for example, an infrared lamp heater, the temperature of the substrate is heated in advance to a desired temperature, for example, approximately 300° C. here. Thereafter, the substrate is fixedly placed in a laser irradiation chamber 1507 passing through gate valve 1506. The gate valve 1506 are then closed the temperature of the substrate is raised to supplement the lack of the energy of the laser beam. Especially, in the case that it is necessary to lengthen the length of the linear beam when the substrate of a large area is processed, the laser energy can be suppressed to lower than a usually necessary value by performing a laser anneal raising a temperature of the substrate.

After being emitted from the laser oscillator 1500, the laser beam is bent by an optical system 1509 with the mirror, not shown in the figure, provided on the quartz window 1510 under 90°. The laser beam is processed to linear beam via a quartz window 1510 at the laser surface in the laser irradiation chamber 1507. The laser beam is irradiated to the substrate provided on the irradiation surface. The optical system 1509 can be used above mentioned one. Further, the one which have the same composition of it can also be used.

The atmosphere of the laser irradiation chamber 1507 is drawn (raised) to the high vacuum level ($10^{-3}$ Pa) using a vacuum pump 1511 before laser irradiation. Or, create a desired atmosphere using the vacuum pump 1511 and a gas cylinder 1512. As stated earlier, the atmosphere can be Ar and $H_2$, or a gaseous mixture thereof.

Thereafter, while irradiating the laser, the substrate is scanned due to the moving mechanism 1513, to thereby irradiate the laser on the substrate. At this time, an infrared lamp, not shown in the figure, may be applied to the portion that is laser irradiated.

After laser irradiation, the substrate is transported to a cooling chamber 1508 where it is slowly cooled and then returned back to the load/unload chamber 1501 via the alignment chamber 1504. Many substrates can be laser annealed by repeating this chain of procedures.

The present embodiment can be performed by combining with Embodiment modes or other Embodiments.

[Embodiment 4]

In this embodiment, the manufacturing method of the active matrix substrate is explained using FIGS. 7 to 8. A substrate on which is formed the driver circuit and the pixel portion having a pixel TFT and a retention capacitor is refereed to as an active matrix substrate for convenience' sake in the present specification.

First, in this embodiment, a substrate 300 is used, which is made of glass such as barium borosilicate glass or aluminum borosilicate, represented by such as Corning #7059 glass and #1737 glass. Note that, as the substrate 300, a quartz substrate, a silicon substrate, a metallic substrate or a stainless substrate on which is formed an insulating film. A plastic substrate with heat resistance to a process temperature of this embodiment may also be used.

Then, a base film 301 formed of an insulating film such as a silicon oxide film, a silicon nitride film or a silicon oxynitride film is formed on the substrate 300. In this embodiment, a two-layer structure is used as the base film 301. However, a single-layer film or a lamination structure consisting of two or more layers of the insulating film may be used. As a first layer of the base film 301, a silicon oxynitride film 301a is formed with a thickness of 10 to 200 nm (preferably 50 to 100 nm) with a plasma CVD method using $SiH_4$, $NH_3$, and $N_2O$ as reaction gas. In this embodiment, the silicon oxynitride film 301a (composition ratio Si=32%, O=27%, N=24% and H=17%) with a film thickness of 50 nm is formed. Then, as a second layer of the base film 301, a silicon oxynitride film 301b is formed and laminated into a thickness of 50 to 200 nm (preferably 100 to 150 nm) with a plasma CVD method using $SiH_4$ and $N_2O$ as reaction gas. In this embodiment, the silicon oxynitride film 301b (composition ratio Si=32%, O=59%, N=7% and H=2%) with a film thickness of 100 nm is formed.

Subsequently, semiconductor layer 304 are formed on the base film. The semiconductor layer 304 are formed from a semiconductor film with an amorphous structure which is formed by a known method (such as a sputtering method, an LPCVD method, or a plasma CVD method), and is subjected to a known crystallization process (a laser crystallization method, a thermal crystallization method, or a thermal crystallization method using a catalyst such as nickel). The crystalline semiconductor film thus obtained is patterned into desired shapes to obtain the semiconductor layers. The semiconductor layer 304 are formed into the thickness of from 25 to 80 nm (preferably 30 to 60 nm). The material of the crystalline semiconductor film is not particularly limited, but it is preferable to be formed of silicon, a silicon germanium (SiGe) alloy, or the like. In this embodiment, 55 nm thick amorphous silicon film is formed by a plasma CVD method, and then, a nickel-containing solution is held on the amorphous silicon film. A dehydrogenation process of the amorphous silicon film is performed (500° C. for one hour in nitrogen atmosphere), and thereafter a thermal crystallization process is performed (550° C. for four hours in nitrogen atmosphere) thereto. Further, to improve the crystallinity thereof, a laser annealing treatment is performed to form the crystalline silicon film. Then, this crystalline silicon film is subjected to a patterning process using a photolithography method, to obtain the semiconductor layers 402 to 406.

Further, after the formation of the semiconductor layer 402 to 406, a minute amount of impurity element (boron or phosphorus) may be doped to control a threshold value of the TFT. Above mentioned doping can be performed to the semiconductor film 304 which is not patterned.

A gate insulating film 407 is then formed for covering the semiconductor layers 402 to 406. The gate insulating film 407 is formed of an insulating film containing silicon by a plasma CVD method or a sputtering method into a film thickness of from 40 to 150 nm. In this embodiment, the gate insulating film 407 is formed of a silicon oxynitride film into a thickness of 110 nm by a plasma CVD method (composition ratio Si=32%, O=59%, N=7%, and H=2%). Of course, the gate insulating film is not limited to the silicon oxynitride film, and an other insulating film containing silicon may be used as a single layer or a lamination structure. Besides, when the silicon oxide film is used, it can be possible to be formed by a plasma CVD method in which TEOS (tetraethyl orthosilicate) and $O_2$ are mixed and discharged at a high frequency (13.56 MHZ) power density of 0.5 to 0.8 W/cm$^2$ with a reaction pressure of 40 Pa and a substrate temperature of 300 to 400° C. Good characteristics as the gate insulating film can be obtained in the manufactured silicon oxide film thus by subsequent thermal annealing at 400 to 500° C.

Then, as shown in FIG. 7C, on the gate insulating film 407, a first conductive film 408 with a thickness of 20 to 100 nm and a second conductive film 409 with a thickness of 100 to 400 nm are formed and laminated. In this embodiment, the first conductive film 408 of TaN film with a film thickness of 30 nm and the second conductive film 409 of a W film with a film thickness of 370 nm are formed into lamination. The TaN film is formed by sputtering with a Ta target under a nitrogen containing atmosphere. Besides, the W film is formed by the sputtering method with a W target. The W film may be formed by a thermal CVD method using tungsten hexafluoride ($WF_6$). Whichever method is used, it is necessary to make the material have low resistance for use as the gate electrode, and it is preferred that the resistivity of the W film is set to less than or equal to 20 $\mu\Omega$cm. By making the crystal grains large, it is possible to make the W film have lower resistivity. However, in the case where many impurity elements such as oxygen are contained within the W film, crystallization is inhibited and the resistance becomes higher. Therefore, in this embodiment, by forming the W film by a sputtering method using a target with a purity of 99.9999% and in addition, by taking sufficient consideration to prevent impurities within the gas phase from mixing therein during the film formation, a resistivity of from 9 to 20 $\mu\Omega$cm can be realized.

Note that, in this embodiment, the first conductive film 408 is made of TaN, and the second conductive film 409 is made of W, but the material is not particularly limited thereto, and either film may be formed of an element selected from the group consisting of Ta, W, Ti, Mo, Al, Cu, Cr, and Nd, or an alloy material or a compound material containing the above element as its main constituent. Besides, a semiconductor film, typified by a polycrystalline silicon film doped with an impurity element such as phosphorus, may be used. Further, an AgPdCu alloy may be used. Besides, any combination may be employed such as a combination in which the first conductive film is formed of tantalum (Ta) and the second conductive film is formed of W, a combination in which the first conductive film is formed of titanium nitride (TiN) and the second conductive film is formed of W, a combination in which the first conductive film is formed of tantalum nitride (TaN) and the second conductive film is formed of Al, or a combination in which the first conductive film is formed of tantalum nitride (TaN) and the second conductive film is formed of Cu.

Next, masks 410 to 415 made of resist are formed using a photolithography method, and a first etching process is performed in order to form electrodes and wirings. This first etching process is performed with the first and second etching conditions. In this embodiment, as the first etching conditions, an ICP (inductively coupled plasma) etching method is used, a gas mixture of $CF_4$, $Cl_2$ and $O_2$ is used as an etching gas, the gas flow rate is set to 25/25/10 sccm, and plasma is generated by applying a 500 W RF (13.56 MHZ) power to a coil shape electrode under 1 Pa. A dry etching device with ICP (Model E645-ICP) produced by Matsushita Electric Industrial Co. Ltd. is used here. A 150 W RF (13.56 MHZ) power is also applied to the substrate side (test piece stage) to effectively apply a negative self-bias voltage. The W film is etched with the first etching conditions, and the end portion of the second conductive layer is formed into a tapered shape.

Thereafter, the first etching conditions are changed into the second etching conditions without removing the masks 410 to 415 made of resist, a mixed gas of $CF_4$ and $Cl_2$ is used as an etching gas, the gas flow rate is set to 30/30 sccm, and plasma is generated by applying a 500 W RF (13.56 MHZ) power to a coil shape electrode under 1 Pa to thereby perform etching for about 30 seconds. A 20 W RF (13.56 MHZ) power is also applied to the substrate side (test piece stage) to effectively a negative self-bias voltage. The W film and the TaN film are both etched on the same order with the second etching conditions in which $CF_4$ and $Cl_2$ are mixed. Note that, the etching time may be increased by approximately 10 to 20% in order to perform etching without any residue on the gate insulating film.

In the first etching process, the end portions of the first and second conductive layers are formed to have a tapered shape due to the effect of the bias voltage applied to the substrate side by adopting masks of resist with a suitable shape. The angle of the tapered portions may be set to 15° to 45°. Thus, first shape conductive layers 417 to 422 (first conductive layers 417a to 422a and second conductive layers 417b to 422b) constituted of the first conductive layers and the second conductive layers are formed by the first etching process. Reference numeral 416 denotes a gate insulating film, and regions of the gate insulating film which are not covered by the first shape conductive layers 417 to 422 are made thinner by approximately 20 to 50 nm by etching.

Then, a first doping process is performed to add an impurity element for imparting an n-type conductivity to the semiconductor layer without removing the mask made of resist (FIG. 8A). Doping may be carried out by an ion doping method or an ion implantation method. The condition of the ion doping method is that a dosage is $1 \times 10^{13}$ to $5 \times 10^{15}$ atoms/cm$^2$, and an acceleration voltage is 60 to 100 keV. In this embodiment, the dosage is $1.5 \times 10^{15}$ atoms/cm$^2$ and the acceleration voltage is 80 keV. As the impurity element for imparting the n-type conductivity, an element which belongs to group 15 of the periodic table, typically phosphorus (P) or arsenic (As) is used, and phosphorus is used here. In this case, the conductive layers 417 to 422 become masks to the impurity element for imparting the n-type conductivity, and high concentration impurity regions 306 to 310 are formed in a self-aligning manner. The impurity element for imparting the n-type conductivity is added to the high concentration impurity regions 306 to 310 in the concentration range of $1 \times 10^{20}$ to $1 \times 10^{21}$ atoms/cm$^3$.

Thereafter, a second etching process is performed without removing the masks made of resist. A mixed gas of $CF_4$, $Cl_2$ and $O_2$ may be used as etching gas and the W film is selectively etched. The second conductive layers 428b to 433b are formed by a second etching process. On the other hand, the first conductive layers 417a to 422a are hardly etched, and the second conductive layers 428 to 433 are formed.

Next, a second doping process is performed as shown in FIG. 8C without removing the masks from resists. The impurity elements which imparts n-type conductivity is doped under the condition that the dose amount is lower than that of a first doping process with an acceleration voltage 70 to 120 keV. In this embodiment, the dosage is $1.5 \times 10^{14}$ atoms/cm$^2$, and the acceleration voltage is 90 keV. A new impurity region is formed at the semiconductor layer inside of a first high concentration impurity region 306 to 310. The second doping process is using a second shaped conductive layers 428 to 433 as masks, and the impurity elements is doped with a semiconductor layer at the below of the second conductive layers 428 to 433. High concentration impurity regions 423a to 427a and low concentration impurity region 423b to 427b are newly formed.

Next, after the masks are removed, masks 434a and 434b form resists are newly formed, and the third etching process is performed as shown in FIG. 9A. A mixed gas of $SF_6$ and $Cl_2$ is used as an etching gas, the gas flow rate is set to 50/10 sccm, and plasma us generated by applying a 500 W RF (13.56 MHZ) power to a coil shape electrode under 1 Pa to thereby perform etching for about 30 seconds. A 10 W RF (13.56 MHZ) power is also applied to the substrate side (test piece stage) to effectively applied to a negative self-bias voltage. Thus the third shape conductive layers 435 to 438 etching a TaN film of the p-channel type TFT and the TFT of the pixel portion (pixel TFT) by above-mentioned third etching process.

Next, after removing the masks from resists, the insulating layers 439 to 444 is formed, removing selectively the gate insulating film 416 and using the second shape conductive layer 428, 430 and the second shape conductive layers 435 to 438 as a mask. (FIG. 9B) Successively, there is carried out a third doping processing by newly forming masks 445a to 445c comprising resists. By the third doping processing, there are formed impurity regions 446, 447 added with an impurity element for providing a conductive type reverse to the above-described one conductive type at semiconductor layers constituting activation layers of p-channel type TFTs. The impurity regions are formed self-adjustingly by adding the impurity element providing p-type by using the second conductive layers 435a, 438a as masks against the impurity element. In this embodiment, the impurity regions 446, 447 are formed by an ion doping process using diborane ($B_2H_6$). (FIG. 9C) In the third doping processing, the semiconductor layers forming n-channel type TFTs are covered by the masks 445a to 445c comprising resists. Although the impurity regions 446, 447 are added with phosphor at concentrations different from each other by the first doping processing and the second doping process, in any of the regions, by carrying out the doping processing such that the concentration of the impurity element for providing p-type falls in a range of $2 \times 10^{20}$ through $2 \times 10^{21}$ atoms/cm$^3$, the impurity regions function as source regions and drain regions of p-channel type TFTs and accordingly, no problem is posed. In this embodiment, portions of the semiconductor layers constituting activation layers of p-channel type TFTs are exposed and accordingly, there is achieved an advantage that the impurity element (boron) is easy to add thereto.

The impurity regions are formed at the respective semiconductor layers by the above-described steps.

Next, a first interlayer insulating film 461 is formed by removing the masks 445a to 445c comprising resists. The first interlayer insulating film 461 is formed by an insulating film including silicon and having a thickness of 100 through 200 nm by using a plasma CVD process or a sputtering process. In this embodiment, a silicon oxynitride film having a film thickness of 150 nm is formed by a plasma CVD process. Naturally, the first interlayer insulating film 461 is not limited to the silicon oxynitride film but other insulating film including silicon may be used as a single layer or a laminated structure.

Next, as shown by FIG. 10A, there is carried out a step of activating the impurity elements added to the respective semiconductor layers. The activating step is carried out by a thermal annealing process using a furnace annealing furnace. The thermal annealing process may be carried out in a nitrogen atmosphere having an oxygen concentration equal to or smaller than 1 ppm, preferably, equal to or smaller than 0.1 ppm at 400 through 700° C. representatively, 500 through 550° C., and in this embodiment, the activation processing is carried out by a heat treatment at 550° C. for 4 hours. Further, other than the thermal annealing process, a laser annealing process or a rapid thermal annealing process (RTA process) is applicable.

Further, in this embodiment, simultaneously with the activation processing, nickel used as a catalyst in the crystallizing step, is gettered by impurity regions 423a, 425a, 426a, 446a and 447a including a high concentration of phosphorus and a nickel concentration in the semiconductor layer mainly constituting a channel-forming region is reduced. According to TFT having the channel forming region fabricated in this way, the off current value is reduced, crystalline performance is excellent and therefore, there is provided high field effect mobility and excellent electric properties can be achieved.

Further, the activation processing may be carried out prior to forming the first interlayer insulating film. However, when a wiring material used is weak at heat, it is preferable to carry out the activation processing after forming the interlayer insulating film (insulating film whose major component is silicon, for example, silicon nitride film) for protecting wirings as in this embodiment.

Further, there is carried out a step of hydrogenating the semiconductor layer by carrying out a heat treatment in an atmosphere including 3 to 100% of hydrogen at 300 to 550° C. for 1 through 12 hours. In this embodiment, there is carried out a heat treatment in a nitrogen atmosphere including about 3% of hydrogen at 410° C. for 1 hour. The step is a step of terminating dangling bond of the semiconductor layer by hydrogen included in the interlayer insulating film. As other means of hydrogenation, there may be carried out plasma hydrogenation (using hydrogen excited by plasma).

Further, when a laser annealing process is used as an activation processing, it is preferable to irradiate laser beam of excimer laser or YAG laser after carrying out the hydrogenation.

Next, there is formed a second interlayer insulating film 462 comprising an inorganic insulating material or an organic insulating material above the first interlayer insulating film 461. In this embodiment, there is formed a acrylic resin film having film thickness of 1.6 μm and there is used a film having a viscosity of 10 to 1000 cp, preferably, 40 through 200 cp and formed with projections and recesses at a surface thereof.

In this embodiment, in order to prevent the mirror reflection, projection and recess portions are formed on the surfaces of the pixel electrodes by forming the second interlayer insulating film with projection and recess portions on the surface. Also, in order to attain light scattering characteristics by forming the projection and recess portions on the surfaces of the pixel electrodes, projection portions may be formed in regions below the pixel electrodes. In this case, since the same photomask is used in the formation of the TFTs, the projection portions can be formed without increasing the number of processes. Note that the projection portion may be suitably provided in the pixel portion region except for the wirings and the TFT portion on the substrate. Thus, the projection and recess portions are formed on the surfaces of the pixel electrodes along the projection and recess portions formed on the surface of the insulating film covering the projection portion.

Also, a film with the leveled surface may be used as the second interlayer insulating film 462. In this case, the following is preferred. That is, after the formation of the pixel electrodes, projection and recess portions are formed on the surface with a process using a known method such as a sandblast method or an etching method. Thus, since the mirror reflection is prevented and reflection light is scattered, whiteness is preferably increased.

Then, in a driver circuit 506, wirings 463 to 467 electrically connected with the respective impurity regions are formed. Note that those wirings are formed by patterning a lamination film of a Ti film with a film thickness of 50 nm and an alloy film (alloy film of Al and Ti) with a film thickness of 500 nm.

Also, in a pixel portion 507, a pixel electrode 470, a gate wiring 469, and a connection electrode 468 are formed (FIG. 10B). By this connection electrode 468, an electrical connection between a source wiring (lamination layer of the impurity region 443b and the first conductive layer 449) and the pixel TFT is formed. Also, an electrical connection between the gate wiring 469 and the gate electrode of the pixel TFT is formed. With respect to the pixel electrode 470, an electrical connection with the drain region 442 of the pixel TFT and an electrical connection with the semiconductor layer 458 which functions as one of electrodes for forming a storage capacitor are formed. It is desired that a material having a high reflectivity, such as a film containing Al or Ag as its main constituent, or a lamination film thereof, is used for the pixel electrode 470.

Thus, the driver circuit 506 having a CMOS circuit formed by an n-channel TFT 501 and a p-channel TFT 502 and an n-channel type TFT 503, and the pixel portion 507 having a pixel TFT 504 and a retaining capacitor 505 can be formed on the same substrate. As a result, the active matrix substrate is completed.

The n-channel type TFT 501 of the driver circuit 506 has a channel forming region 423c, a low concentration impurity region (GOLD region) 423b overlapping with the first conductive layer 428b constituting a portion of the gate electrode, and a high concentration impurity region 423a which functions as the source region or the drain region. The p-channel type TFT 502 forming the CMOS circuit by connecting with the n-channel type TFT 501 through an electrode 466 has a channel forming region 446d, an impurity region 446b, 446c formed outside the gate electrode, and a high concentration impurity region 446a which functions as the source region or the drain region. The n-channel type TFT 503 has a channel forming region 425c, a low concentration impurity region 425 (GOLD region) overlapping with the first conductive layer 430a comprising a part of the gate electrode, and a high concentration impurity region 425a which functions as the source region or the drain region.

The pixel TFT 504 of the pixel portion includes a channel forming region 426c, a low concentration impurity region 426b (LDD region) formed outside the gate electrode, and the high concentration impurity region 426a functioning as a source region or a drain region. Besides, impurity elements imparting p-type conductivity are added to the respective semiconductor layers 447a, 447b functioning as one of the electrodes of the storage capacitor 505. The storage capacitor 505 is formed from the electrode (a lamination of 438 and 438b) and the semiconductor layers 447a to 447c using the insulating film 444 as a dielectric member.

Further, in the pixel structure of this embodiment, an end portion of the pixel electrode is formed by arranging it so as to overlap with the source wiring so that the gap between the pixel electrodes is shielded from light without using a black matrix.

Figure 11:
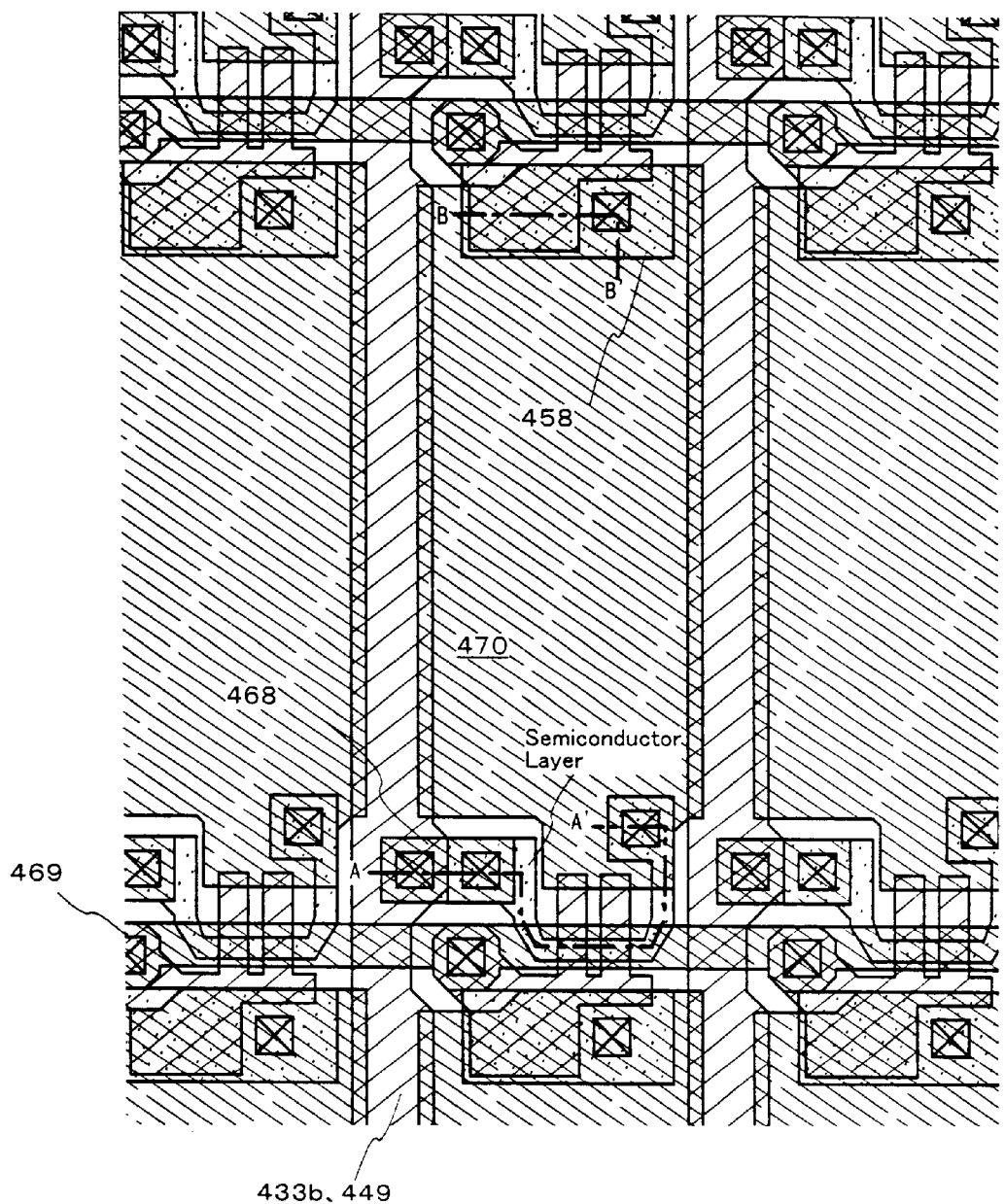
FIG. 11 is a top view of a structure including pixel TFTs.

A top view of the pixel portion of the active matrix substrate manufactured in this embodiment is shown in FIG. 11. Note that, the same reference numerals are used to indicate parts corresponding FIGS. 7 to 10. A dash line A–A' in FIG. 10 corresponds to a sectional view taken along the line A–A' in FIG. 11. Also, a dash line B–B' in FIG. 10 corresponds to a sectional view taken along the line B–B' in FIG. 11.

This embodiment can be performed by freely combining with Embodiments 1 to 3.

[Embodiment 5]

In this embodiment, a manufacturing example that an EL (electro luminescence) display device as one of the example of the light emitting device using the present invention.

In this specification, the light emitting device is a generic name which is a display panel enclosing the light emitting element between the substrate and the cover material and the display module mounted mounting an IC on the display panel. The light emitting element has a light emitting layer containing an organic compound material which can obtain the electro luminescence generated by adding the electric field, the anode layer and the cathode layer. Further, in the luminescence in an organic compound, the luminescence (fluorescence light) when returning from the state of singlet exciton to the basic state and the luminescence (phosphorus light) when returning from the state of triplet exciton to the basic state. Either or both luminescence are contained.

Figure 13:
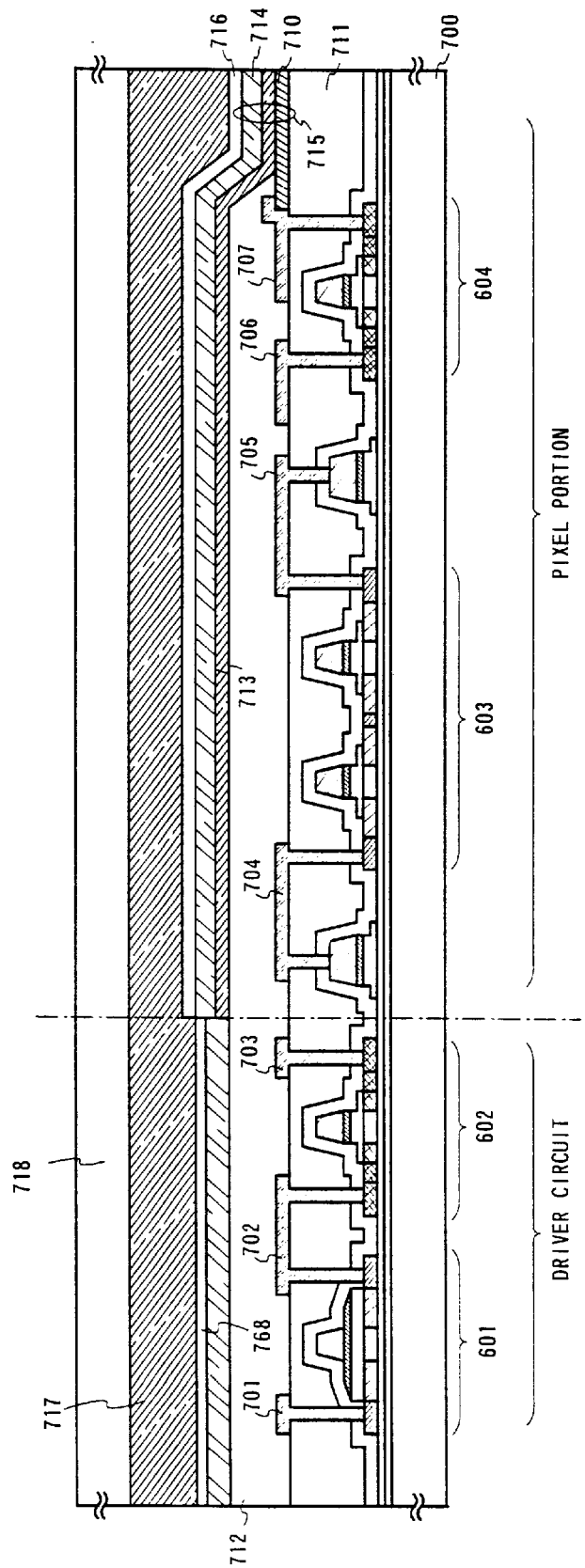
FIG. 13 is a cross-sectional view showing the process of manufacturing an EL display device.

In FIG. 13, a switching TFT 603 provided on a substrate 700 is formed using the n-channel type TFT 503 of FIG. 13. Thus, this structure may be referred to the description of the n-channel type TFT 503.

Note that, in this embodiment, a double gate structure in which two channel forming regions are formed is used.

However, a single gate structure in which one channel forming region is formed, or a triple gate structure in which three channel forming regions are formed may be used.

A driver circuit provided on the substrate 700 is formed using the CMOS circuit of FIG. 13. Thus, this structure may be referred to the descriptions of the n-channel type TFT 501 and the p-channel type TFT 502. Note that, in this embodiment, the single gate structure is used. However, the double gate structure or the triple gate structure may also be used.

Also, wirings 701 and 703 function as a source wiring of the CMOS circuit, a wiring 702 functions as a drain wiring thereof. A wiring 704 functions as a wiring for electrically connecting a source wiring 708 with a source region of the switching TFT. A wiring 705 functions as a wiring for electrically connecting a drain wiring 709 with a drain region of the switching TFT.

Note that, a current-controlled TFT 604 is formed using the p-channel type TFT 502 of FIG. 13. Thus, this structure may be referred to the descriptions of the p-channel type TFT 502. Note that, in this embodiment, the single gate structure is used. However, the double gate structure or the triple gate structure may be used.

Also, a wiring 706 is a source wiring (corresponding to a current supply line) of the current-controlled TFT. Reference numeral 707 denotes an electrode which is electrically connected with a pixel electrode 710 by overlapping with the pixel electrode 710 of the current-controlled TFT.

Note that, reference numeral 710 denotes the pixel electrode (anode of an EL element) made from a transparent conductive film. As the transparent conductive film, a compound of indium oxide and tin oxide, a compound of indium oxide and zinc oxide, zinc oxide, tin oxide, or indium oxide can be used. Also, the transparent conductive film to which gallium is added may be used. The pixel electrode 710 is formed on a level interlayer insulating film 711 before the formation of the above wirings. In this embodiment, it is very important to level a step in the TFT using the leveling film 711 made of resin. Since an EL layer formed later is extremely thin, there is the case where insufficient light emitting occurs due to the step. Thus, in order to form the EL layer as level as possible, it is desired that the step is leveled before the formation of the pixel electrode 710.

After the wirings 701 to 707 are formed, a bank 712 is formed as shown in FIG. 13. The bank 712 may be formed by patterning an insulating film with a thickness of 100 to 400 nm containing silicon or an organic resin film.

Note that, since the bank 712 is an insulating film, it is necessary to pay attention to a dielectric breakdown of an element in the film formation. In this embodiment, a carbon particle or a metal particle is added to the insulating film which is a material of the bank 712 to reduce a resistivity. Thus, an electrostatic occurrence is suppressed. Here, an additional amount of the carbon particle or the metal particle may be controlled such that the resistivity is $1\times10^6$ to $1\times10^{12}$ Ωm (preferably, $1\times10^8$ to $1\times10^{10}$ Ωm. An EL layer 713 is formed on the pixel electrode 710. Note that, only one pixel is shown in FIG. 13. However, in this embodiment, the EL layers are formed corresponding to respective colors of R (red), G (green), and B (blue). Also, in this embodiment, a low molecular organic EL material is formed by an evaporation method. Concretely, copper phthalocyanine (CuPc) film with a thickness of 20 nm is provided as a hole injection layer, and a tris-8-quinolinolate aluminum complex (Alq$_3$) film with a thickness of 70 nm is provided thereon as a light emitting layer. Thus, a lamination structure of those films is formed. A light emitting color can be controlled by adding a fluorochrome such as quinacridon, perylene, or DCM1 to Alq$_3$.

Note that, the above example is one example of the organic EL material which can be used as the EL layer, and it is unnecessary to be limited to this example. The EL layer (layer for causing light to emit and a carrier to move for the emitting of light) may be formed by freely combining the light emitting layer and a charge transport layer or a charge injection layer. For example, in this embodiment, although the example that the low molecular organic EL material is used as the EL layer is shown, a polymer organic EL material may be also used. Also, an inorganic material such as silicon carbide can be used as the charge transport layer or the charge injection layer. A known material can be used as the organic EL material and the inorganic material.

Next, a cathode 714 made from a conductive film is provided on the EL layer 713. In the case of this embodiment, an alloy film of aluminum and lithium is used as the conductive film. Of course, a known MgAg film (alloy film of magnesium and silver) may be used. As a cathode material, the conductive film made of an element which belongs to group 1 or group 2 of the periodic table, or the conductive film to which those elements are added may be used.

When this cathode 714 is formed, an EL element 715 is completed. Note that, the EL element 715 completed here represents a capacitor formed by the pixel electrode (anode) 710, the EL layer 713, and the cathode 714.

It is effective to provide a passivation film 716 so as to completely cover the EL element 715. As the passivation film 716, a single layer of an insulating film containing a carbon film, a silicon nitride film, or silicon oxynitride film, or a lamination layer of a combination with the insulating film is used.

Here, it is preferred that a film with a good coverage is used as the passivation film, and it is effective to use the carbon film, in particular a DLC (diamond like carbon) film. Since the DLC film can be formed in a range of a room temperature to 100° C., it can be easily formed over the EL layer 713 with a low heat-resistance. Also, since the DLC film has a high blocking effect against oxygen, the oxidation of the EL layer 713 can be suppressed. Thus, the oxidation of the EL layer 713 during the following sealing process can be prevented.

Further, a sealing member 717 is provided on the passivation film 716, and then a cover member 718 is adhered to the sealing member 717. Ultraviolet light cured resin may be used as the sealing member 717, and it is effective to provide a material having a hygroscopic effect or a material having an oxidation inhibition effect inside. Also, in this embodiment, a member in which a carbon film (preferably, a diamond carbon like film) is formed on both surfaces of, a glass substrate, a quartz substrate, or a plastic substrate (including a plastic film) is used as the cover member 718.

Thus, an EL display device of the structure as shown in FIG. 13 is completed. Note that, after the formation of the bank 712, it is effective to successively perform the processes until the formation of the passivation film 716 using a film formation apparatus of a multi chamber system (or an inline system) without exposing to air. Further, processes until the adhesion of the cover member 718 can be successively performed without exposing to air.

Thus, n-channel TFTs 601 and 602, a switching TFT (n-channel TFT) 603, and a current control TFT (n-channel TFT) 604 are formed on the insulator 501 in which a plastic substrate is formed as a base. The number of masks required in the manufacturing process until now is less than that required in a general active matrix EL display device.

That is, the manufacturing process of the TFTs is largely simplified, and thus the improvement of yield and the reduction of a manufacturing cost can be realized.

Further, as described using FIG. 13, when the impurity regions overlapped with the gate electrode through the insulating film are provided, the n-channel type TFT having a high resistant against the deterioration due to a hot carrier effect can be formed. Thus, the EL display device with high reliability can be realized.

In this embodiment, only the structures of the pixel portion and the driver circuit are shown. However, according to the manufacturing process of this embodiment, logic circuits such as a signal separation circuit, a D/A converter, an operational amplifier, and a γ correction circuit can be further formed on the same insulator. A memory and a microprocessor can be also formed.

An EL light emitting device of this embodiment after the sealing (filling) process for protecting the EL element will be described using FIGS. 14A and 14B. Note that, if necessary, reference symbols used in FIG. 13 are referred to.

Figure 14A:
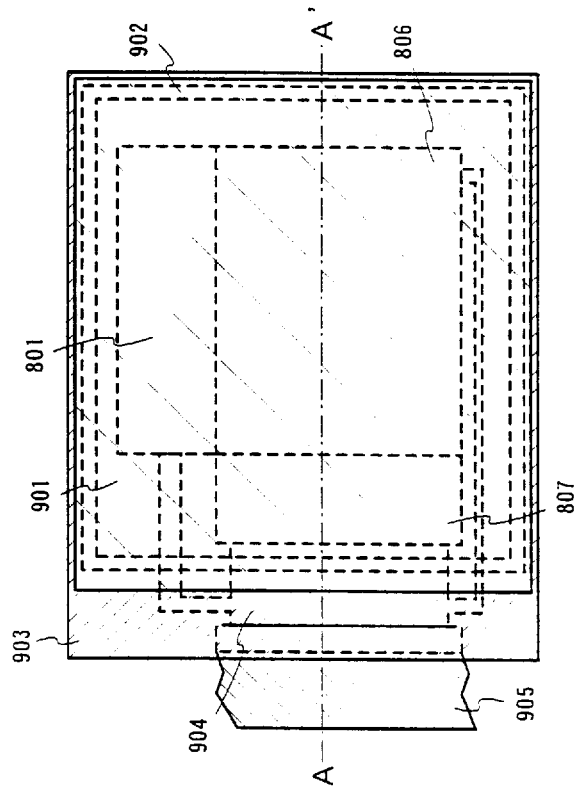
FIGS. 14A and 14B are a cross-sectional view showing the process of manufacturing an EL display device.
Figure 14B:
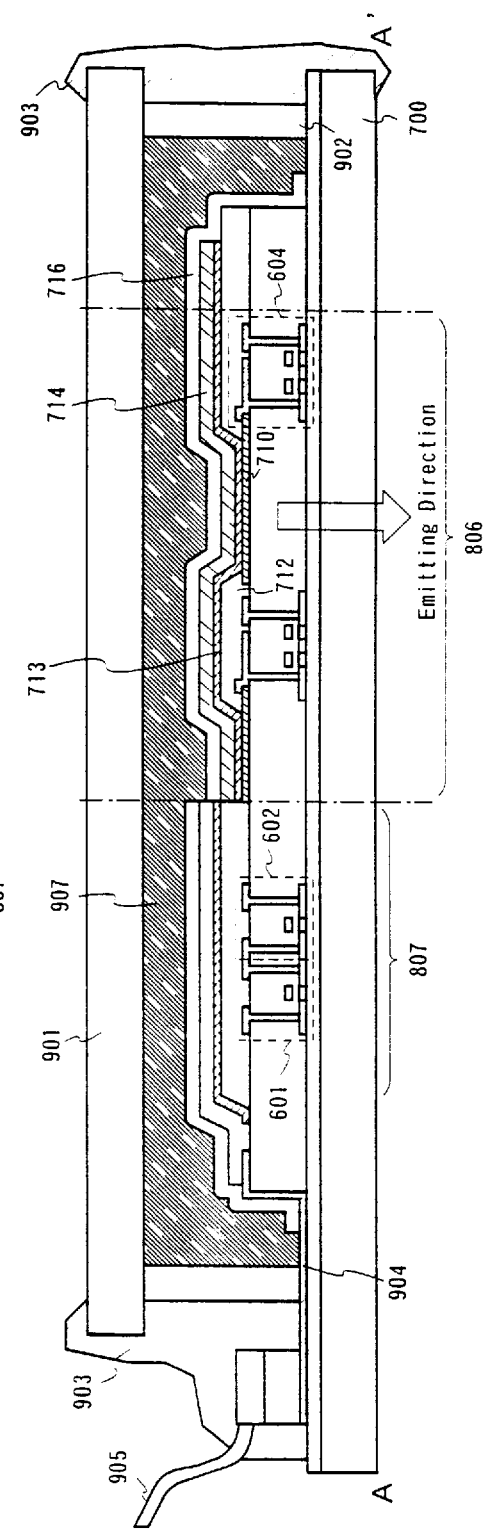

FIG. 14A is a top view representing the state after the sealing of the EL element, and FIG. 14B is a cross sectional view along a line A—A of FIG. 14A. Reference numeral 801 shown by a dotted line denotes a source side driver circuit, reference numeral 806 denotes a pixel portion, and reference numeral 807 denotes a gate side driver circuit. Also, reference numeral 901 denotes a cover member, reference numeral 902 denotes a first sealing member, and reference numeral 903 denotes a second sealing member. A sealing member 907 is provided in the inside surrounded by the first sealing member 902.

Note that, reference numeral 904 denotes a wiring for transmitting signals inputted to the source side driver circuit 801 and the gate side driver circuit 807. The wiring 904 receives a video signal and a clock signal from an FPC (flexible printed circuit) 905 as an external input terminal. In FIG. 14A, although only the FPC is shown, a printed wiring board (PWB) may be attached to the FPC. The EL display device in this specification includes not only the main body of the EL display device but also the EL display device to which the FPC or the PWB is attached.

Next, the cross sectional structure will be described using FIG. 14B. The pixel portion 806 and the gate side driver circuit 807 are formed over a substrate 700. The pixel portion 806 is formed by a plurality of pixels each having a current control TFT 604 and a pixel electrode 710 electrically connected with the drain region thereof. Also, the gate side driver circuit 807 is formed using the CMOS circuit in which an n-channel type TFT 601 and a p-channel type TFT 602 are combined with each other (see FIG. 15).

The pixel electrode 710 functions as an anode of the EL element. Also, banks 712 are formed in both ends of the pixel electrode 710. An EL layer 713 and a cathode 714 of the EL element are formed on the pixel electrode 710.

The cathode 714 also functions as a wiring common to all pixels, and is electrically connected with the FPC 905 through the connection wiring 904. Further, all elements which are included in the pixel portion 806 and the gate side driver circuit 807 are covered with the cathode 714 and a passivation film 567.

Also, the cover member 901 is adhered to the resultant substrate 700 by the first sealing member 902. Note that, in order to keep an interval between the cover member 901 and the EL element, a spacer made of a resin film may be provided. Then, the inside of the first sealing member 902 is filled with a sealing member 907. Note that, it is preferred that epoxy resin is used as the first sealing member 902 and the sealing member 907. Also, it is desired that the first sealing member 902 is a material to which moisture and oxygen are not penetrated as much as possible. Further, a material having a hygroscopic effect or a material having an oxidation inhibition effect may be contained in the sealing member 907.

The sealing member 907 provided to cover the EL element also functions as an adhesive for adhering the cover member 901 to the resultant substrate 700. Also, in this embodiment, FRP (fiberglass-reinforced plastics), PVF (polyvinylfluoride). Mylar, polyester, or acrylic can be used as a material of a plastic substrate 901a composing the cover member 901.

Also, after the adhering of the cover member 901 using the sealing member 907, the second sealing member 903 is provided to cover side surfaces (exposed surfaces) of the sealing member 907. In the second sealing member 903, the same material as that of the first sealing member 902 can be used.

By sealing the EL element with the sealing member 907 with the above structure, the EL element can be completely shielded from the outside, and penetration of a substance (such as moisture or oxygen) which prompts deterioration due to oxidation of the EL layer, from the outside, can be prevented. Thus, the EL display device with high reliability is obtained.

At the semiconductor film in the light emitting device manufactured by above mentioned steps, interference is decreased at the irradiation surface or the neighborhood, and enough operation characteristics and reliability can be realized by the laser beam which is improved the uniformity of the distribution of energy. The liquid crystal display device fabricated in this way can be used as display portions of various electronic apparatus.

This embodiment can be performed by freely combining with Embodiments 1 to 4.

[Embodiment 6]

Figure 12:
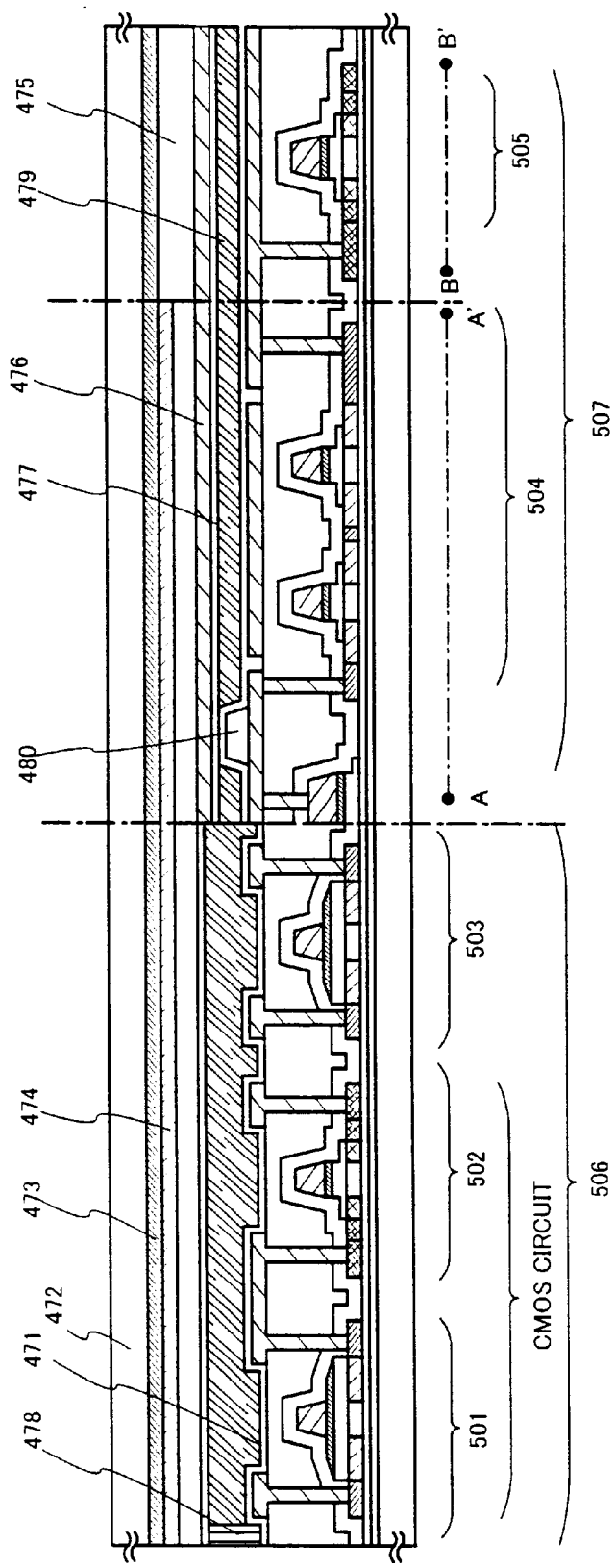
FIG. 12 is a cross-sectional view of the structure of a liquid crystal panel.

In this embodiment, an explanation will be given as follows of steps of fabricating a reflection type liquid crystal display device from the active matrix substrate fabricated in Embodiment 4. FIG. 12 is used in the explanation.

First, in accordance with Embodiment 4, there is provided the active matrix substrate in the state of FIG. 10B and thereafter, an alignment film 471 is formed above the active matrix substrate of FIG. 10B, at least above the pixel electrode 470 and a rubbing processing is carried out. Further, in this embodiment, before forming the alignment film 471, by patterning an organic resin film such as an acrylic resin film, spacers in a columnar shape 480 are formed at desired positions in order to maintain an interval between substrates. Further, in place of the spacers in the columnar shape, spacers in a spherical shape may be scattered over an entire face of the substrate.

Next, an opposed substrate 472 is prepared. Successively, there are formed color layers 473 and 474 and a flattening film 475. A light shielding portion is formed by overlapping the color layer 473 of red color and the color layer 474 of blue color. Further, the light shielding portion may be formed by overlapping portions of a color layer of red color and a color layer of green color.

In this embodiment, there is used the substrate shown in Embodiment 4. Therefore, in FIG. 11 showing the top view of the pixel portion of Embodiment 4, it is necessary to shield at least a clearance between the gate wiring 469 and the pixel electrode 470, a clearance between the gate wiring 469 and the connection electrode 468 and a clearance between the connection electrode 468 and the pixel electrode 470. In this embodiment, the respective color layers are arranged such that the light shielding portions constituted by laminating the color layers overlap positions to be shielded and the opposed substrate is pasted thereto.

A number of steps can be reduced by shielding the clearances among the respective pixels by the light shielding portions constituted by laminating the color layers in this way without forming light shielding layers such as black masks.

Next, the opposed electrode 476 constituted by a transparent conductive film is formed on the flattening film 475 at least at the pixel portion, an alignment film 477 is formed over an entire face of the opposed substrate and the rubbing processing is carried out.

Further, the active matrix substrate formed with the pixel portion and the drive circuit and the opposed substrate are pasted together by a seal member 478. The seal member 478 is mixed with a filler and two sheets of the substrates are pasted together at a uniform interval therebetween by the filler and the spacers in the columnar shape. Thereafter, the interval between the two substrates is injected with a liquid crystal material 479 and is completely sealed by a seal agent (not illustrated). A publicly-known liquid crystal material may be used for the liquid crystal material 479. In this way, the reflection type liquid crystal display apparatus shown in FIG. 12 is finished. Further, as necessary, the active matrix substrate or the opposed substrate may be divided into a desired shape. Further, a polarizer (not illustrated) is pasted to only the opposed substrate. Further, FPC is pasted thereto by using publicly-known technology.

At the semiconductor film in the liquid crystal display device manufactured by above mentioned steps, interference is decreased at the irradiation surface or the neighborhood, and enough operation characteristics and reliability can be realized by the laser beam which is improved the uniformity of the distribution of energy. The liquid crystal display device fabricated in this way can be used as display portions of various electronic apparatus.

This embodiment can be performed by freely combining with Embodiments 1 to 4.

[Embodiment 7]

The CMOS circuit and the pixel portion formed by implementing the present invention can be used in various electro-optical devices (active matrix type liquid crystal display device, active matrix EC display device, and active matrix EL display). That is, the present invention can be implemented in all electronic equipment that incorporate these electro-optical devices as a display portion.

The following can be given as such electronic equipment: a video camera, a digital camera, a projector (a rear type or a front type), a head mount display (goggle type display), a car navigation system, a car stereo, a personal computer, a portable information terminal (such as a mobile computer, a cellular phone, and an electronic book) etc. Some examples of these are shown in FIGS. 15A to 15F, FIGS. 16A to 16D and FIGS. 17A to 17C.

Figure 15A:
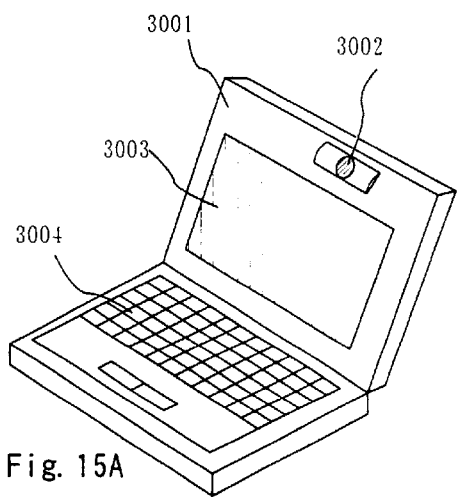
FIGS. 15A to 15F are diagrams showing examples of electronic devices.

FIG. 15A shows a personal computer that is comprised of a main body 3001, an image input portion 3002, a display portion 3003, and a keyboard 3004. The present invention can be applied to the image input portion 3002, the display portion 3003 and the other signal control circuit.

Figure 15B:
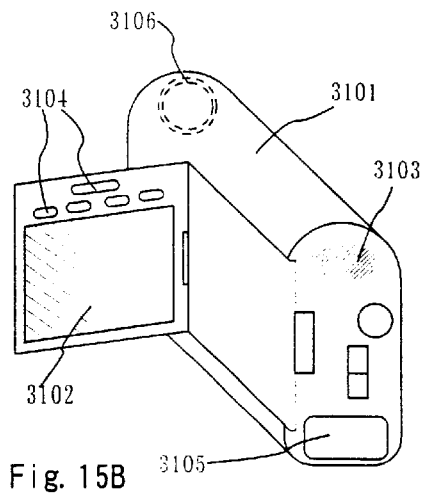

FIG. 15B shows a video camera that is comprised of a main body 3101, a display portion 3102, an audio input portion 3103, operation switches 3104, a battery 3105, and an image receiving portion 3106. The present invention can be applied to the display portion 3102, and other signal control circuit.

Figure 15C:
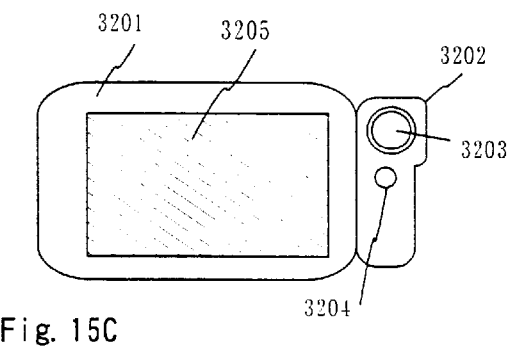

FIG. 15C shows a mobile computer that is composed of a main body 3201, a camera portion 3202, an image receiving portion 3203, operation switches 3204, and a display portion 3205. The present invention can be applied to the display portion 3205 and other signal control circuit.

Figure 15D:
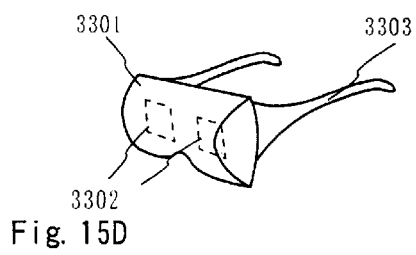

FIG. 15D shows a goggle type display that is comprised of a main body 3301, display portions 3302, and arm portions 3303. The present invention can be applied to the display portion 3302 and other signal control circuit.

Figure 15E:
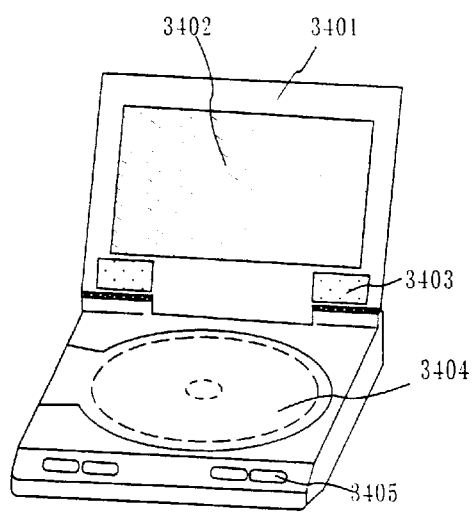

FIG. 15E shows a player which uses a recording medium in which a program is stored (hereinafter referred to as a recording medium) and which is comprised of a main body 3401, a display portion 3402, speaker portions 3403, a recording medium 3404, and operation switches 3405. A DVD (Digital Versatile Disc), a CD or the like is used as the recording medium to enable the player to appreciate music and the movies, and play a game or the Internet. The present invention can be applied to the display portion 3402 and other signal control circuit.

Figure 15F:
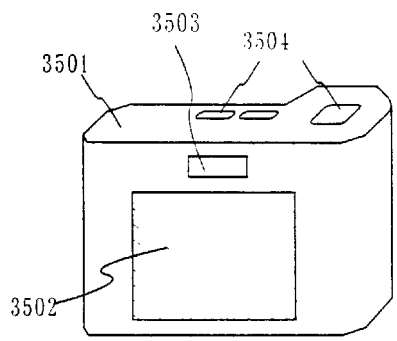

FIG. 15F shows a digital camera that is comprised of a main body 3501, a display portion 3502, an eye-piece portion 3503, operation switches 3504, and an image receiving portion (not shown in the figure). The present invention can be applied to the display portion 3502 and other signal control circuit.

Figure 16A:
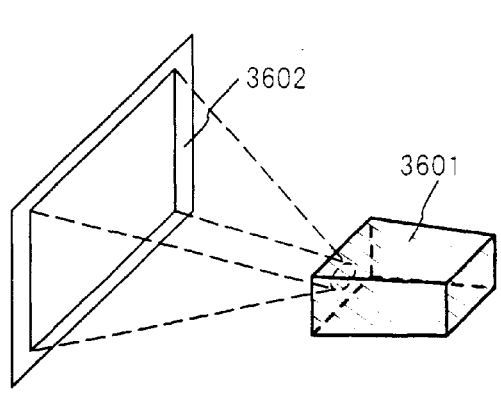
FIGS. 16A to 16D are diagrams showing examples of electronic devices.

FIG. 16A shows a front type projector that is comprised of a projection unit 3601, a screen 3602, and the like. The present invention can be applied to a liquid crystal display device 3808 which is a part structuring the projection unit 3601 and other signal control circuit.

Figure 16B:
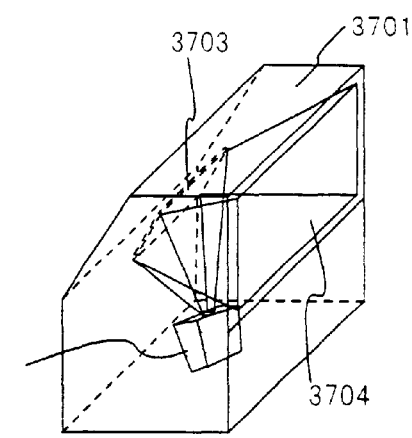

FIG. 16B shows a rear type projector that is comprised of a main body 3701, a projection unit 3702, a mirror 3703, a screen 3704, and the like. The present invention can be applied to the liquid crystal display device 3808 which is a part structuring the projection unit 3702 and other signal control circuit.

Figure 16C:
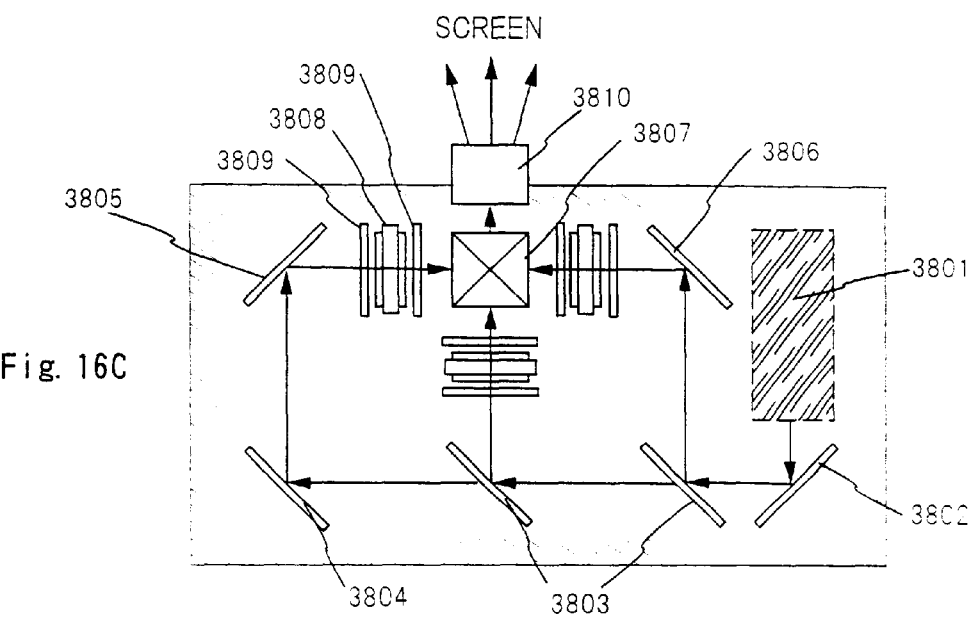

Illustrated in FIG. 16C is an example of the structure of the projection units 3601 and 3702 that are shown in FIGS. 16A and 16B, respectively. Each of the projection units 3601 and 3702 is comprised of a light source optical system 3801, mirrors 3802 and 3804 to 3806, dichroic mirrors 3803, a prism 3807, liquid crystal display devices 3808, phase difference plates 3809, and a projection optical system 3810. The projection optical system 3810 is constructed of an optical system including projection lenses. An example of a three plate system is shown in the present embodiment, but there are no special limitations. For instance, an optical system of single plate system is acceptable. Further, the operator may suitably set optical systems such as optical lenses, polarizing film, film to regulate the phase difference, IR film, within the optical path shown by the arrows in FIG. 16C.

Figure 16D:
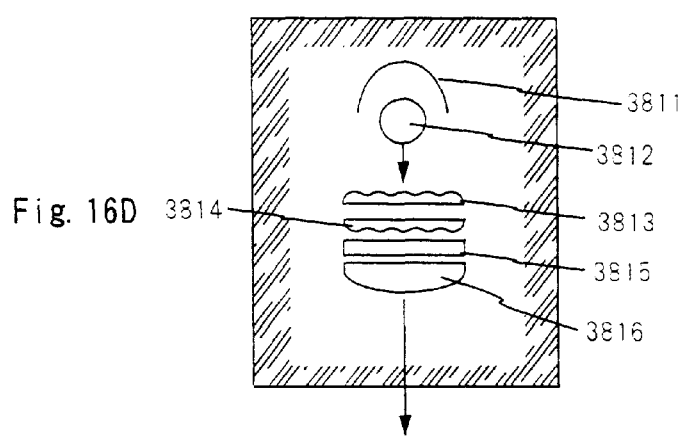

In addition, FIG. 16D shows an example of the structure of the light source optical system 3801 of FIG. 16C. In the present embodiment, the light source optical system 2801 is composed of a reflector 3811, a light source 3812, a lens array 3813 and 3814, a polarizing conversion element 3815, and a condenser lens 3816. Note that the light source optical system shown in FIG. 16D is an example, and it is not limited to the illustrated structure. For example, the operator may suitably set optical systems such as optical lenses, polarizing film, film to regulate the phase difference, and IR film.

The projector illustrated in FIGS. 16A to 16D, show the electro optical device of transparent type but the example of the electro optical device of reflection type.

Figure 17A:
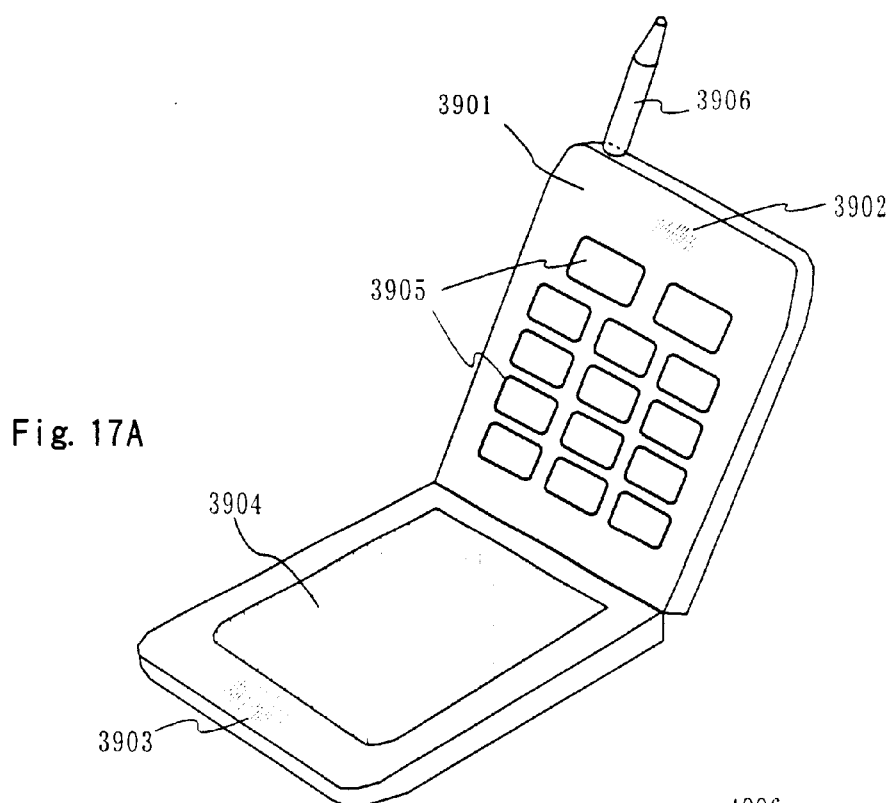
FIGS. 17A to 17C are diagrams showing examples of electronic devices.

FIG. 17A shows a cellular phone that is comprised of a main body 3901, an audio output portion 3902, an audio input portion 3903, a display portion 3904, an operation switches 3905 and an antenna 3906 etc. The present invention can be applied to the audio output portion 3902, the audio input portion 3903, the display portion 3904 and other signal control circuit.

Figure 17B:
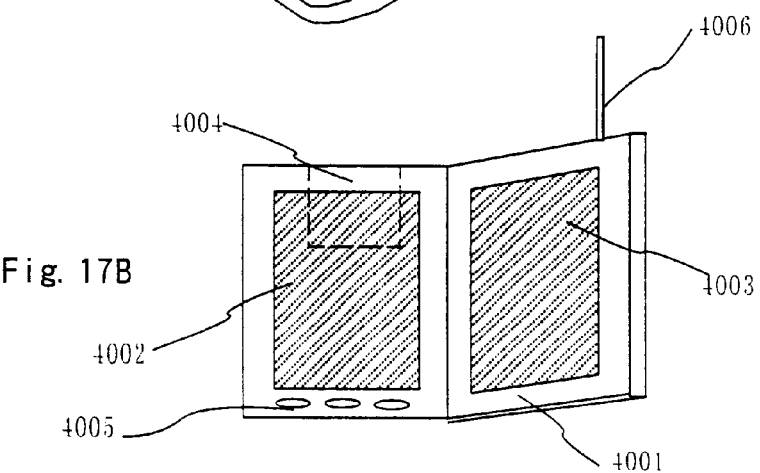

FIG. 17B shows a mobile book (electronic book) that is comprised of a main body 4001, a display portion 4002, 4003, a recording medium 4004, an operation switches 4005 and a antenna 4006 etc. The present invention can be applied to the display portion 4002, 4003 and other signal circuit.

Figure 17C:
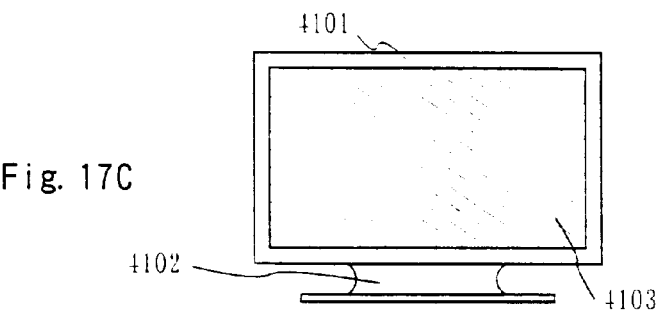

FIG. 17C shows a display that is comprised of a main body 4101, a support stand 4102 and display portion 4103 etc. The present invention can be applied to the display portion 4103. They are especially advantageous for cases in which the screen is made large, and is favorable for displays having a diagonal greater than or equal to 10 inches (especially one which is greater than or equal to 30 inches).

Thus, the application range for the present invention is extremely wide, and it may be applied to electronic equipment in all fields. Further, the electronic equipment of this Embodiment can be realized with a composition that uses any combination of Embodiments 1 to 6.

The uniformity of the distribution of energy of a laser beam having coherence can be remarkably improved by reducing the coherence of the laser beam if the present invention is applied to the optical system conventionally used. If a combination of the invention disclosed in this specification and a solid-state laser typified by a YAG laser having high coherence is used to perform the process of crystallizing a semiconductor film, a remarkable reduction in manufacturing cost can be expected. Also, suitable operating characteristics and sufficiently high reliability can be achieved in electro-optic devices and semiconductor devices fabricated by making TFTs on the thus-obtained semiconductor film and by using the TFTs, which devices are typified by an active-matrix liquid crystal display device.

What is claimed is:

1. A method of processing a laser beam, the method comprising:

oscillating a laser beam;

dividing the laser beam into two laser beams in a first direction, the two laser beams having polarization directions independent of each other;

dividing the two laser beams into a plurality of laser beams in a second direction perpendicular to the first direction, the plurality of laser beams having optical path lengths different from each other; and combining the plurality of laser beams into one laser beam on or in the vicinity of the irradiation plane.

2. A method according to claim 1, wherein the step of dividing the laser beam into two laser beams having the polarization directions independent of each other is performed using at least a $\lambda/2$ plate.

3. A method according to claim 2, wherein a linear laser beam comprises one kind or a plurality of kinds of laser beams selected from laser beams emitted from a YAG laser, a $YVO_4$ laser, and a YLF laser.

4. A method according to claim 1, wherein forming the plurality of laser beams having optical path lengths different from each other comprises using at least a block having a high transmittance with respect to a linear laser beam.

5. A method according to claim 4, wherein a linear laser beam comprises one kind or a plurality of kinds of laser beams selected from laser beams emitted from a YAG laser, a $YVO_4$ laser, and a YLF laser.

6. A method according to claim 1, wherein dividing a linear laser beam into the plurality of laser beams comprises using a cylindrical lens having an F-number of 20 or larger.

7. A method according to claim 6, wherein a linear laser beam comprises one kind or a plurality of kinds of laser beams selected from laser beams emitted from a YAG laser, a $YVO_4$ laser, and a YLF laser.

8. A method according to claim 1, wherein combining the plurality of laser beams comprises using a cylindrical lens having an F-number of 20 or larger.

9. A method according to claim 1, wherein the laser beam comprises one kind or a plurality of kinds of laser beams selected from laser beams emitted from a YAG laser; a $YVO_4$ laser, and a YLF laser.

10. A method of processing a laser beam, the method comprising:
   oscillating a laser beam;
   dividing the laser beam into two laser beams in a first direction, the two laser beams having polarization directions perpendicular to each other;
   dividing the two laser beams into a plurality of laser beams in a second direction perpendicular to the first direction, the plurality of laser beams having optical path lengths different from each other; and
   combining the plurality of laser beams into one laser beam on or in the vicinity of the irradiation plane.

11. A method according to claim 10, wherein dividing the laser beam into two laser beams having polarization directions perpendicular to each other comprises using $\lambda/2$ plate.

12. A method according to claim 11, wherein a linear laser beam comprises one kind or a plurality of kinds of laser beams selected from laser beams emitted from a YAG laser, a $YVO_4$ laser, and a YLF laser.

13. A method according to claim 10, wherein forming the plurality of laser beams having optical path lengths different from each other comprises using at least a block having a high transmittance with respect to a linear laser beam.

14. A method according to claim 10, wherein dividing a linear laser beam into the plurality of laser beams comprises using a cylindrical lens having an F-number of 20 or larger.

15. A method according to claim 10, wherein combining the plurality of laser beams comprises using a cylindrical lens having an F-number of 20 or larger.

16. A method according to claim 10, wherein a linear laser beam comprises one kind or a plurality of kinds of laser beams selected from laser beams emitted from a YAG laser, a $YVO_4$ laser, and a YLF laser.

17. A method of processing a linear laser beam, the method comprising:
   an oscillating a laser beam;
   dividing the linear laser beam into two laser beams in a first direction, the two laser beams having polarization directions perpendicular to each other;
   dividing the two laser beams into a plurality of laser beams in a second direction perpendicular to the first direction, the plurality of laser beams having optical path lengths different from each other; and
   combining the plurality of laser beams into one laser beam on or in the vicinity of the irradiation plane to make the distribution of energy of the one linear laser beam uniform in a long-dimension direction.

18. A method according to claim 17, wherein dividing a linear laser beam into two laser beams having the polarization directions perpendicular to each other comprises using a $\lambda/2$ plate.

19. A method according to 17, wherein forming the plurality of laser beams having optical path lengths different from each other comprises using at least a block having a high transmittance with respect to a linear laser beam.

20. A method according to claim 17, wherein dividing a linear laser beam into the plurality of laser beams comprises using a cylindrical lens having an F-number of 20 or larger.

21. A method according to claim 17, wherein combining the plurality of laser beams comprises using a cylindrical lens having an F-number of 20 or larger.

22. A method according to claim 17, wherein a linear laser beam comprises one kind or a plurality of kinds of laser beams selected from laser beams emitted from a YAG laser, a $YVO_4$ laser, and a YLF laser.

23. A method of processing a laser beam, the method comprising:
   oscillating a laser beam;
   dividing the laser beam into two laser beams in a first direction, the two laser beams having circular polarization directions independent of each other;
   dividing the two laser beams into a plurality of laser beams in a second direction perpendicular to the first direction, the plurality of laser beams having optical path lengths different from each other; and
   combining the plurality of laser beams into one laser beam on or in the vicinity of the irradiation plane.

24. A method according to claim 23, wherein dividing the laser beam into two laser beams having circular polarization directions independent of each other comprises using a $\lambda/2$ plate.

25. A method according to claim 24, wherein a linear laser beam comprises one kind or a plurality of kinds of laser beams selected from laser beams emitted from a YAG laser, a $YVO_4$ laser, and a YLF laser.

26. A method according to claim 23, wherein forming the plurality of beams having optical path lengths different from each other comprises using at least a block having a high transmittance with respect to a linear laser beam.

27. A method according to claim 23, wherein dividing a linear laser beam into the plurality of laser beams comprises using at least a cylindrical lens having an F-number of 20 or larger.

28. A method according to claim 23, wherein combining the plurality of laser beams comprises using a cylindrical lens having an F-number of 20 or larger.

29. A method according to claim 23, wherein a linear laser beam comprises one kind or a plurality of kinds of laser beams selected from laser beams emitted from a YAG laser, a $YVO_4$ laser, and a YLF laser.

30. A method of processing a linear laser beam, the method comprising:
   oscillating a laser beam:
   dividing the laser beam into two laser beams in a first direction, the two laser beam having circular polarization directions independent of each other;
   dividing the two laser beams into a plurality of laser beams in a second direction perpendicular to the first direction, the plurality of laser beams having optical path lengths different from each other; and
   combining the plurality of laser beams into one linear laser beam on or in the vicinity of the irradiation plane to make the distribution of energy of the one linear laser beam uniform in a long-dimension direction.

31. A method according to claim 30, wherein dividing a linear laser beam into two laser beams having circular polarization directions independent of each other comprises using a $\lambda/2$ plate.

32. A method according to claim 30, wherein forming the plurality of laser beams having optical path lengths different from each other comprises using at least a block having a high transmittance with respect to a linear laser beam.

33. A method according to claim 30, wherein dividing a linear laser beam into the plurality of laser beams comprises using at least a cylindrical lens having an F-number of 20 or larger.

34. A method according to claim 30, wherein combining the plurality of laser beams comprises using a cylindrical lens having an F-number of 20 or larger.

35. A method according to claim 30, wherein a linear laser beam comprises one kind or a plurality of kinds of laser beams selected from laser beams emitted from a YAG laser, a YVO$_4$ laser, and a YLF laser.

36. A laser irradiation apparatus comprising:
   a laser oscillator for forming a laser beam having coherence;
   means for dividing the laser beam into two laser beams in a first direction, the divided two laser beams having polarization directions independent of each other;
   means for dividing the two laser beams into a plurality of laser beams in a second direction perpendicular to the first direction, the plurality of laser beams having optical path lengths different from each other; and
   means for combining the plurality of laser beams into one laser beam on or in the vicinity of the irradiation plane.

37. A laser irradiation apparatus according to claim 36, wherein the means for dividing the laser beam into two laser beams having polarization directions independent of each other comprises at least a λ/2 plate.

38. A laser irradiation apparatus according to claim 36, wherein said means for forming different optical path lengths in correspondence with the plurality of laser beams comprises a block having a high transmittance with respect to the laser beam.

39. A laser irradiation apparatus according to claim 36, wherein said laser oscillator comprises one kind or a plurality selected from the group consisting of a YAG laser, a YVO$_4$ laser, and a YLF laser.

40. A laser irradiation apparatus according to claim 36, wherein said means for dividing the laser beam into the plurality of laser beams comprises a cylindrical lens having an F-number of 20 or larger.

41. A laser irradiation apparatus according to claim 36, wherein said means for combining the plurality of laser beams comprises a cylindrical lens having an F-number of 20 or larger.

42. A laser irradiation apparatus comprising:
   a laser oscillator for forming a laser beam of linearly polarized laser light having coherence;
   means for dividing the laser beam into two laser beams in a first direction, the two laser beams having polarization directions perpendicular to each other;
   means for dividing the two laser beams into a plurality of laser beams in a second direction perpendicular to the first direction, the plurality of laser beams having optical path lengths different from each other; and
   means for combining the plurality of laser beams into one laser beam on or in the vicinity of the irradiation plane.

43. A laser irradiation apparatus according to claim 42, wherein the means for dividing the laser beam into two laser beams having the polarization directions perpendicular to each other comprises a λ/2 plate.

44. A laser irradiation apparatus according to claim 42, wherein said means for forming different optical path lengths in correspondence with the plurality of laser beams comprises a block having a high transmittance with respect to the laser beam.

45. A laser irradiation apparatus according to claim 42, wherein said laser oscillator comprises one kind or a plurality selected from the group consisting of a YAG laser, a YVO$_4$ laser, and a YLF laser.

46. A laser irradiation apparatus according to claim 42, wherein said means for dividing the laser beam into the plurality of laser beams comprises a cylindrical lens having an F-number of 20 or larger.

47. A laser irradiation apparatus according to claim 42, wherein said means for combining the plurality of laser beams comprises a cylinidrical lens having an F-number of 20 or larger.

48. A laser irradiation apparatus for forming a linear laser beam distributed along or in the vicinity of an irradiation plane, said apparatus comprising:
   a laser oscillator for forming a laser beam of linearly polarized laser light having coherence;
   means for dividing the laser beam into two laser beams in a first direction, the two laser beams having polarization directions perpendicular to each other;
   means for dividing the two laser beams into a plurality of laser beams in a second direction perpendicular to the first direction, the plurality of laser beams having optical path lengths different from each other;
   means for combining the plurality of laser beams into one linear laser beam on or in the vicinity of the irradiation plane to make the distribution of energy of the linear laser beam uniform in a short-dimension direction; and
   means for combining the plurality of laser beams into the one linear laser beam on or in the vicinity of the irradiation plane to make the distribution of energy of the one linear laser beam uniform in a long-dimension direction.

49. A laser irradiation apparatus according to claim 48, wherein the means for dividing the laser beam into two laser beams having the polarization directions perpendicular to each other comprises a λ/2 plate.

50. A laser irradiation apparatus according to claim 48, wherein said means for forming different optical path lengths in correspondence with the plurality of laser beams comprises a block having a high transmittance with respect to the laser beam.

51. A laser irradiation apparatus according to claim 48, wherein said laser oscillator comprises one kind or a plurality selected from the group consisting of a YAG laser, a YVO$_4$ laser, and a YLF laser.

52. A laser irradiation apparatus according to claim 48, wherein said means for dividing the laser beam into the plurality of laser beams comprises a cylindrical lens having an F-number of 20 or larger.

53. A laser irradiation apparatus according to claim 48, wherein said means for combining the plurality of laser beams comprises a cylindrical lens having an F-number of 20 or larger.

54. A laser irradiation apparatus comprising:
   a laser oscillator for forming a laser beam of circularly polarized laser light having coherence;
   means for dividing the laser beam into two laser beams in a first direction, the two laser beams having circular polarization directions independent of each other;
   means for dividing the two laser beams into a plurality of laser beams in a second direction perpendicular to the first direction, the plurality of laser beams having optical path lengths different from each other; and
   means for combining the plurality of laser beams into one laser beam on or in the vicinity of the irradiation plane.

55. A laser irradiation apparatus according to claim 54, wherein said means for dividing the laser beam into two laser beams having circularly polarization directions independent of each other comprises a λ/2 plate.

56. A laser irradiation apparatus according to claim 54, wherein said means for forming different optical path lengths in correspondence with the plurality of laser beams comprises a block having a high transmittance with respect to the laser beam.

57. A laser irradiation apparatus according to claim 54, wherein said laser oscillator comprises one kind or a plurality selected from the group consisting of a YAG laser, a $YVO_4$ laser, and a YLF laser.

58. A laser irradiation apparatus according to claim 54, wherein said means for dividing the laser beam into the plurality of laser beams comprises, a cylindrical lens having an F-number of 20 or larger.

59. A laser irradiation apparatus according to claim 54, wherein said means for combining the plurality of laser beams comprises a cylindrical lens having an F-number of 20 or larger.

60. A laser irradiation apparatus for forming a linear laser beam distributed along or in the vicinity of an irradiation plane, said apparatus comprising:

a laser oscillator for forming a laser beam of circularly polarized laser light having coherence;

means for dividing the laser beam into two laser beams in a first direction, the two laser beams having circular polarization directions independent of each other;

means for dividing the laser beam into a plurality of laser beams in a second direction perpendicular to the first direction, the plurality of laser beams having optical path lengths different from each other; and means for combining the plurality of laser beams into one linear laser beam on or in the vicinity of the irradiation plane to make the distribution of energy of the one linear laser beam uniform in a long-dimension direction.

61. A laser irradiation apparatus according to claim 60, wherein said means for dividing the laser beam into two laser beams having circularly polarization directions independent of each other comprises a $\lambda/2$ plate.

62. A laser irradiation apparatus according to claim 60, wherein said means for forming different optical path lengths in correspondence with the plurality of laser beams comprises a block having a high transmittance with respect to the laser beam.

63. A laser irradiation apparatus according to claim 60, wherein said laser oscillator comprises one kind or a plurality selected from the group, consisting of a YAG laser, a $YVO_4$ laser, and a YLF laser.

64. A laser irradiation apparatus according to claim 60, wherein said means for dividing the laser beam into the plurality of laser beams comprises a cylindrical lens having an F-number of 20 or larger.

65. A laser irradiation apparatus according to claim 60, wherein said means for combining the plurality of laser beams comprises a cylindrical lens having an F-number of 20 or larger.

66. A method of manufacturing a semiconductor device, the method comprising:

forming a semiconductor film over a substrate; and irradiating a linear laser beam to said semiconductor film;

wherein the step of irradiating the linear laser beam includes forming the linear laser beam by:

oscillating a laser beam having coherence;

dividing the laser beam into two laser beams in a first direction, the divided two laser beams having polarization directions independent of each other;

dividing the two laser beam into a plurality of laser beams in a second direction perpendicular to the first direction; and combining the plurality of laser beams into the linear laser beam on or in the vicinity of the irradiation plane such that the linear laser beam has a long-dimension direction parallel to the second direction.

67. A method according to claim 66, wherein oscillating the laser beam comprises using one kind or a plurality of kinds of laser beams selected from the group consisting of a YAG laser, a YVO4 laser, and a YLF laser.

68. A method according to claim 66, wherein forming the linear laser beam comprises using a cylindrical lens having an F-number of 20 or larger. A method according to claim 25, wherein one kind or a plurality of kinds of laser beams selected from the group consisting of a YAG laser, a $YVO_4$ laser, and a YLF laser is used as said laser beam.

69. A method according to claim 66, wherein said semiconductor device is incorporated into an electric equipment selected from the group consisting of a personal computer, a video camera, a mobile computer, a goggle type display, a player, a digital camera, a front type projector, a rear type projector, a cellular phone, a mobile book and a display.

* * * * *